A. H. DYSON.
TELEPHONE SYSTEM.
APPLICATION FILED APR. 27, 1906.
1,184,934.
Patented May 30, 1916.
7 SHEETS—SHEET 2.
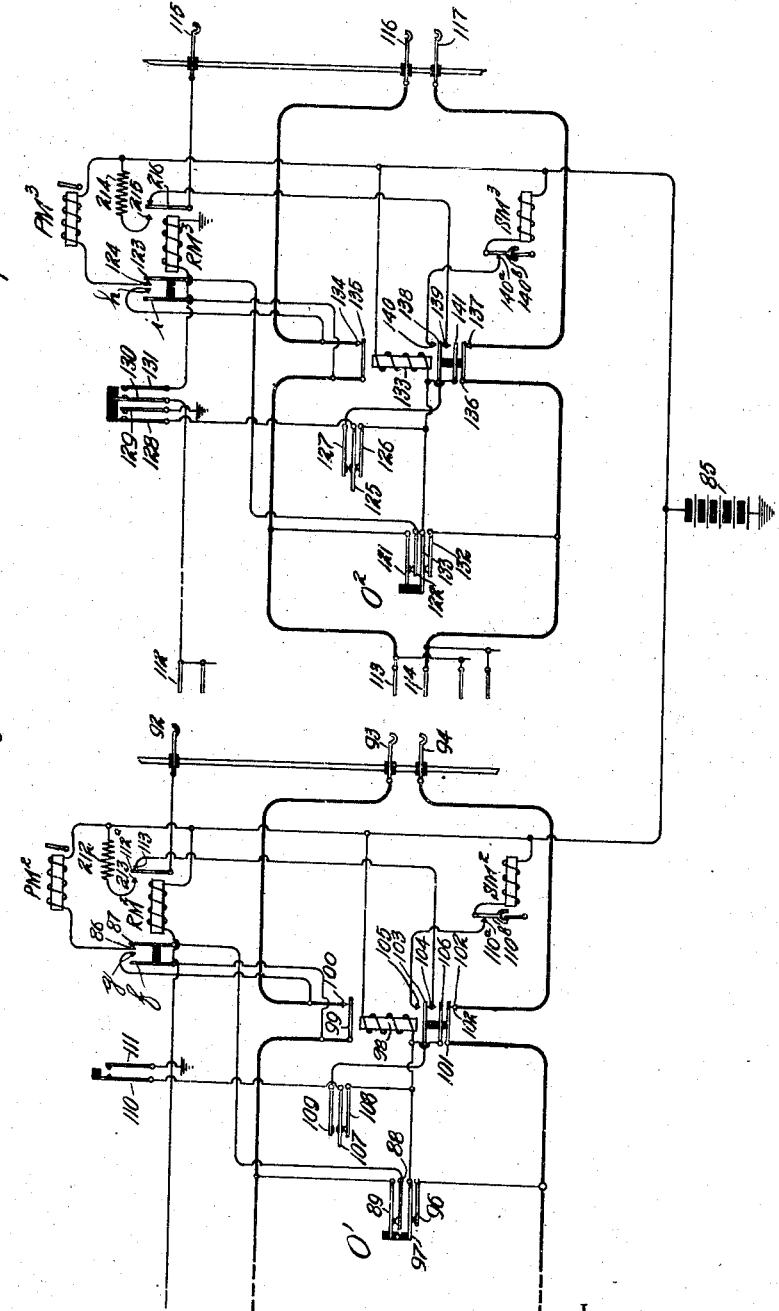
Witnesses:
H.C. Olstead.
Geo. E. Miller.
Inventor
Alfred H. Dyson
by Thomas H. Ferguson
Attorney A. H. DYSON.
TELEPHONE SYSTEM.
APPLICATION FILED APR. 27, 1906.
1,184,934.
Patented May 30, 1916.
7 SHEETS—SHEET 3.
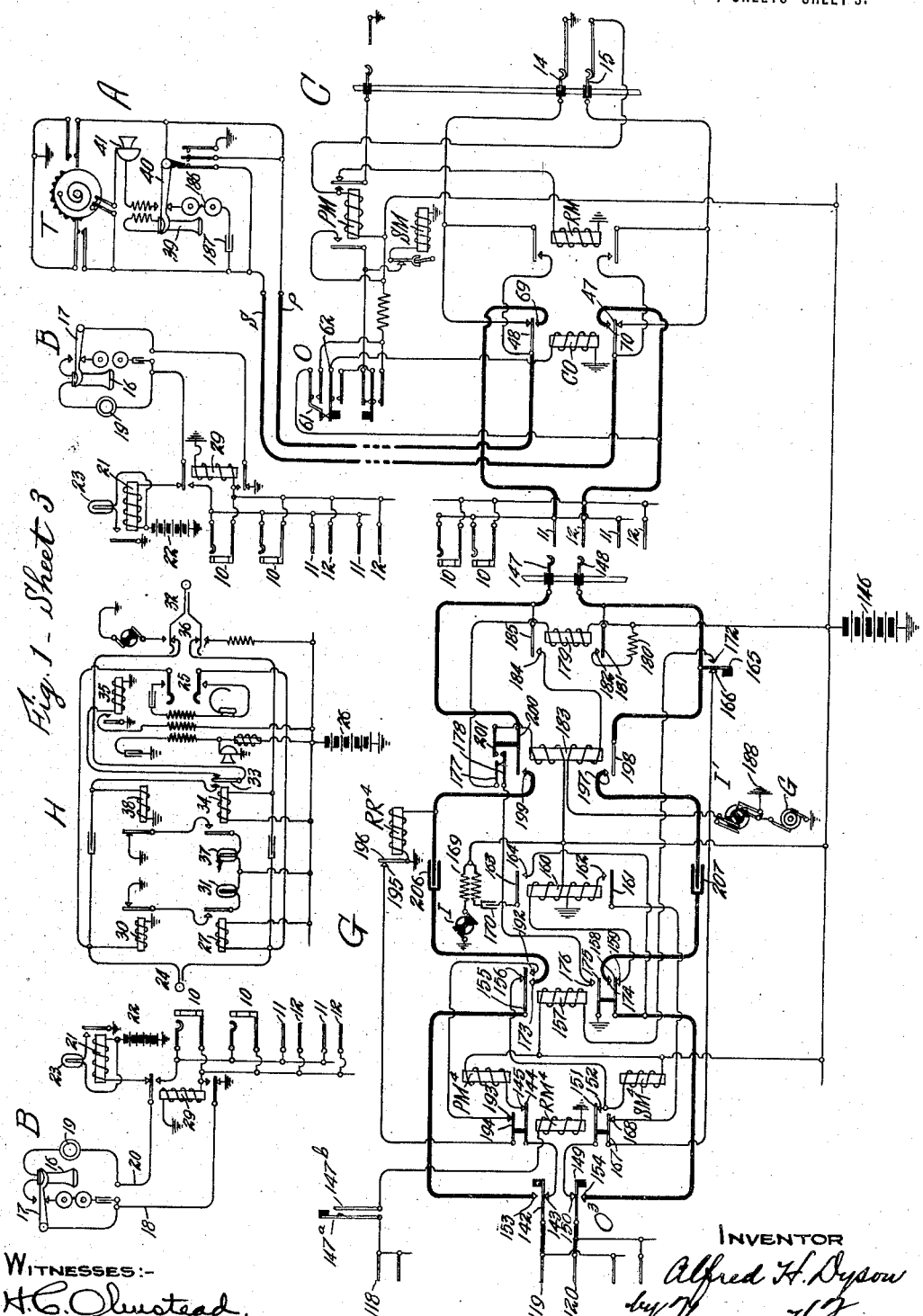
WITNESSES:-
H. C. Olmstead.
Geo. E. Mueller.
INVENTOR
Alfred H. Dyson
by Thomas H. Ferguson
ATTORNEY.

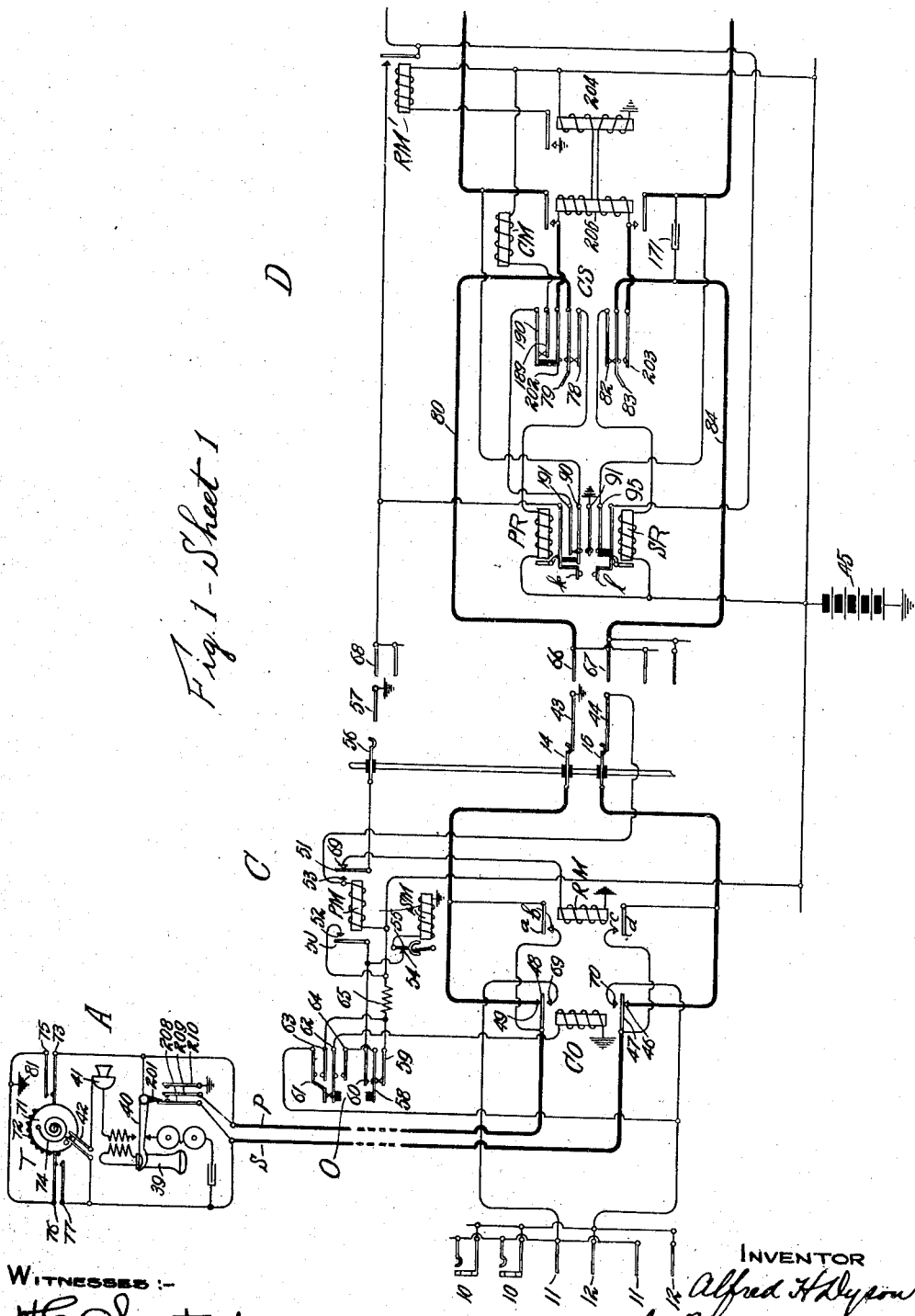

A. H. DYSON.
TELEPHONE SYSTEM.
APPLICATION FILED APR. 27, 1906.
1,184,934.
Patented May 30, 1916.
7 SHEETS—SHEET 4.
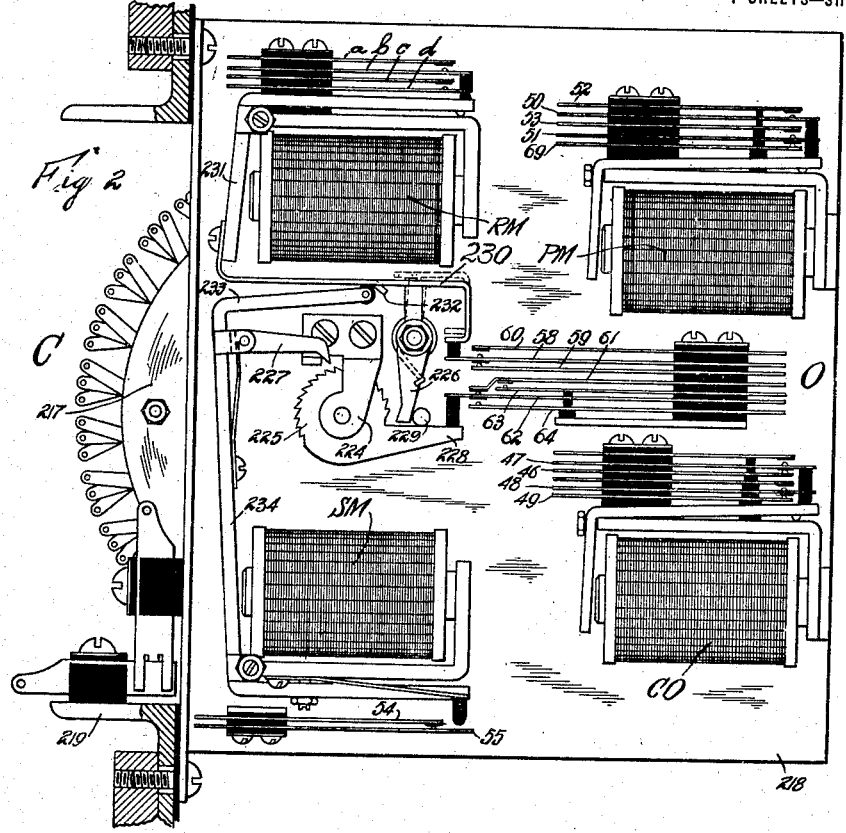
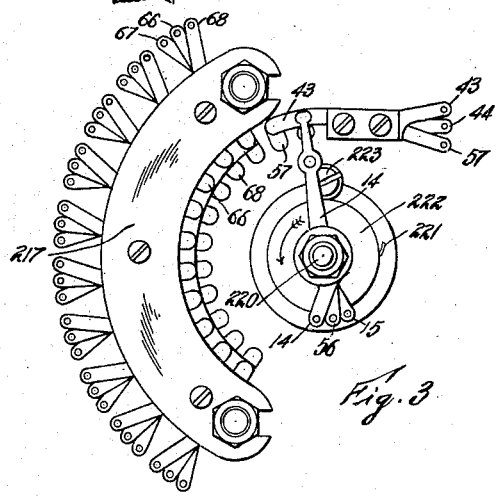
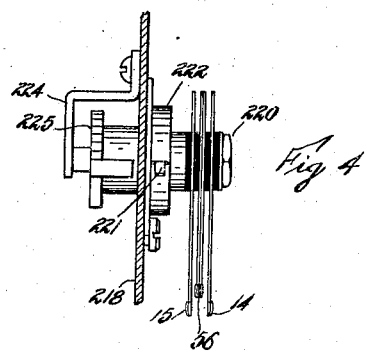
WITNESSES:—
H. C. Olmstead
Geo. E. Mueller.
INVENTOR
Alfred H. Dyson
by Thomas H. Ferguson
ATTORNEY A. H. DYSON.
TELEPHONE SYSTEM.
APPLICATION FILED APR. 27, 1906.
1,184,934.
Patented May 30, 1916.
7 SHEETS—SHEET 5.
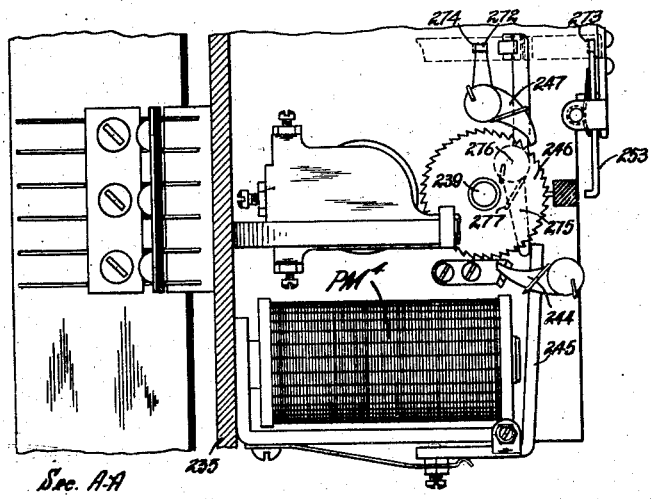
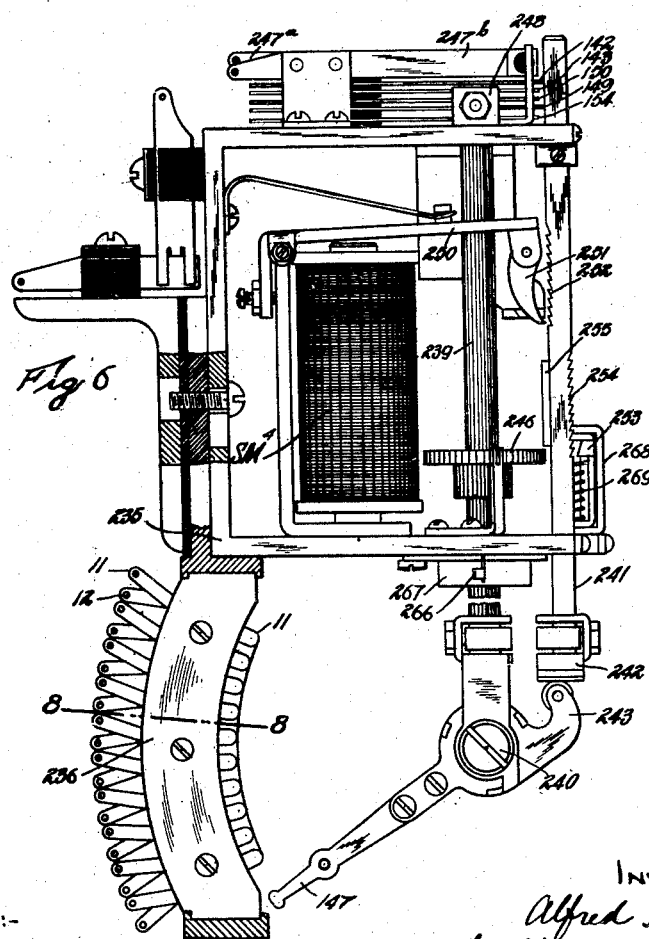

A. H. DYSON.
TELEPHONE SYSTEM.
APPLICATION FILED APR. 27, 1906.
1,184,934.
Patented May 30, 1916.
7 SHEETS—SHEET 6.
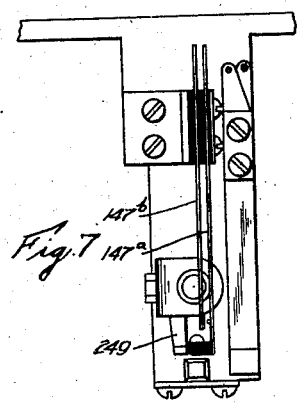
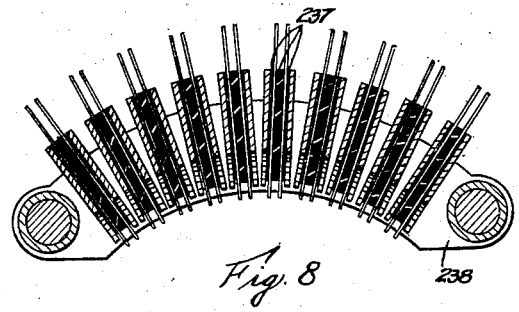
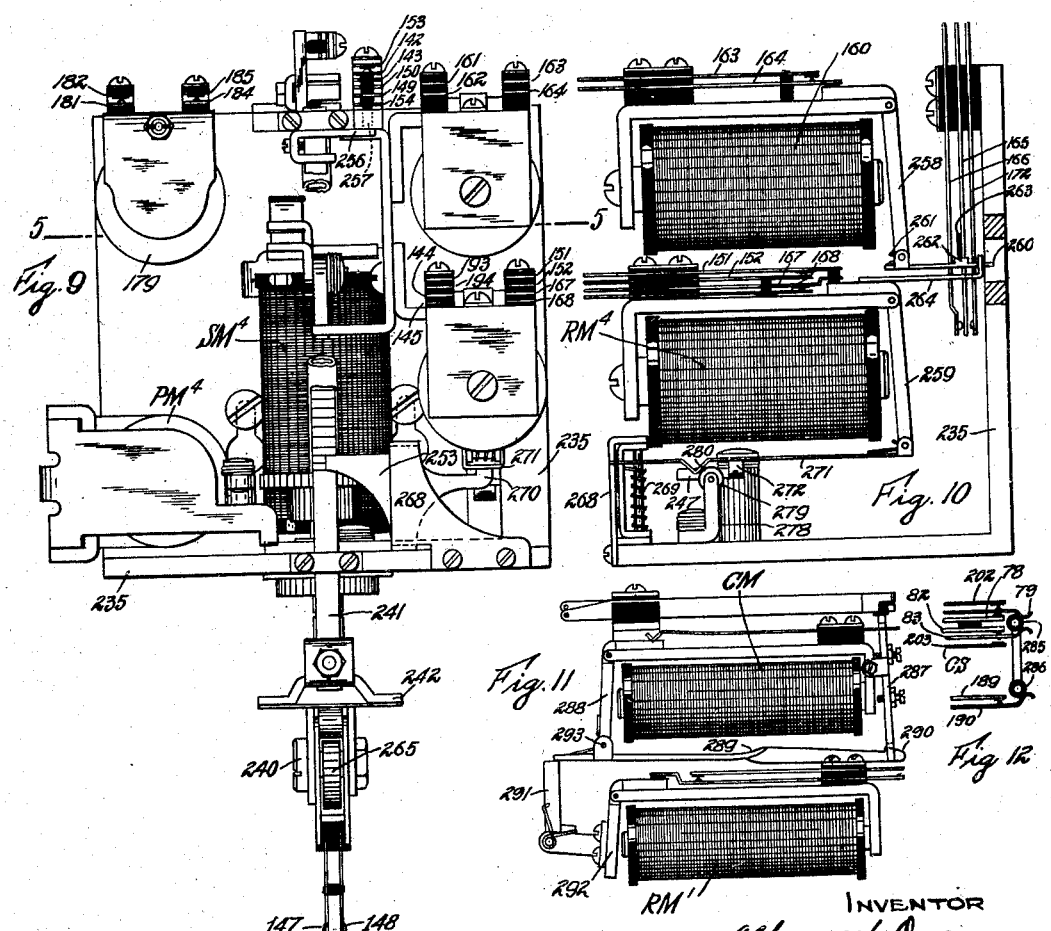
WITNESSES:-
H. C. Olmstead.
Geo. E. Mueller.
INVENTOR
Alfred H Dyson
by Thomas H Ferguson
ATTORNEY A. H. DYSON.
TELEPHONE SYSTEM.
APPLICATION FILED APR. 27, 1906.
1,184,934.
Patented May 30, 1916.
7 SHEETS—SHEET 7.
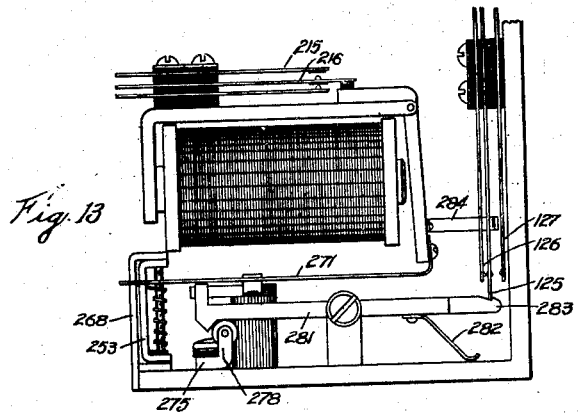
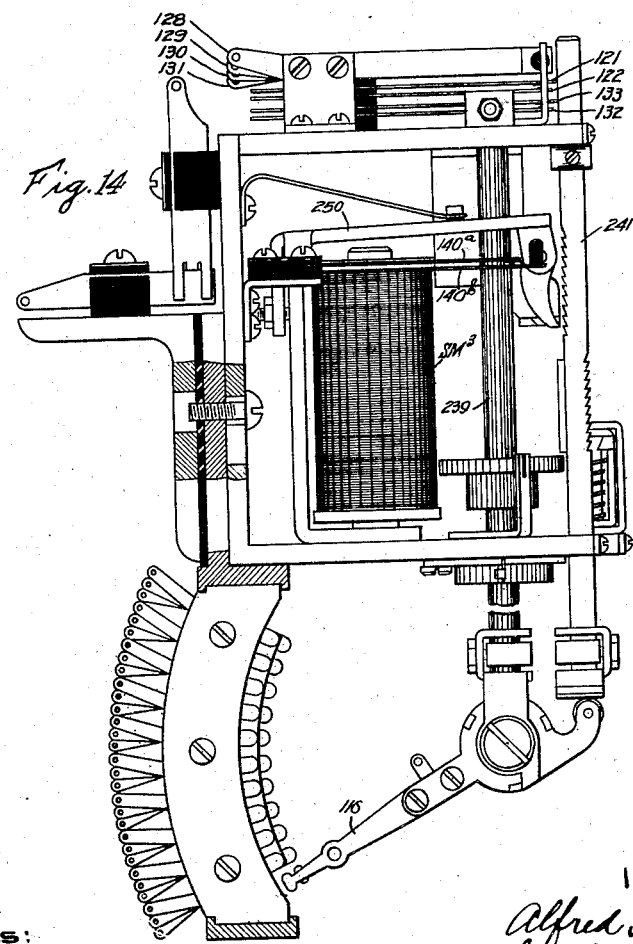

UNITED STATES PATENT OFFICE.

ALFRED H. DYSON, OF CHICAGO, ILLINOIS, ASSIGNOR, BY MESNE ASSIGNMENTS, TO KELLOGG SWITCHBOARD & SUPPLY COMPANY, A CORPORATION OF ILLINOIS.

TELEPHONE SYSTEM.

1,184,934.      Specification of Letters Patent.      Patented May 30, 1916.

Application filed April 27, 1906. Serial No. 314,018.

*To all whom it may concern:*

Be it known that I, ALFRED H. DYSON, a citizen of the United States, residing at Chicago, in the county of Cook and State of Illinois, have invented a new and useful Improvement in Telephone Systems, of which the following is a specification.

The present invention relates to telephone exchange systems and has for its general object to provide a combined manual and automatic system in which a calling party, provided with automatic substation equipment, may automatically establish talking connection with a substation provided with either automatic or manual equipment; and in which a subscriber, provided with the usual manual substation equipment, may, through the agency of the usual central station operator, obtain connection with either a manually or an automatically equipped line.

Another object of the invention is to so construct and arrange the automatic portion of the equipment that it may be readily and cheaply added to existing manual systems for coöperation therewith when extensions to such systems are required.

Other objects are to provide a system which shall employ a minimum of relays and other parts and be efficient in operation and economical to construct, install and maintain.

In carrying out my invention, each telephone line entering the exchange, whether manually or automatically equipped, is provided with terminals in the form of multiple jacks for manual connection and multiple switch contacts for automatic connection, and each automatically equipped line is further connected with movable switch contacts. The movable switch contacts of a calling line coöperate with interconnecting link-circuit apparatus and switching mechanism to establish connection from the calling line to the fixed contacts of a called line, whether manually or automatically equipped, in response to the manipulations of a calling device at the calling line substation. The fixed multiple switch contacts for each line are arranged in pairs, and the link-circuit which establishes the final connection with a called line terminates in two movable contacts which engage a pair of fixed contacts of the called line to establish the necessary conversational circuit. In this connection, I have devised a novel arrangement of switch apparatus and circuits by which a busy signal may be transmitted to the calling party or not, in accordance with the electrical condition of the pair of called line contacts thus engaged.

The invention also includes means for automatically ringing a called party when his line is found to be idle and means for interrupting the normal connection between an automatically equipped line and its movable switch contacts as soon as connection is established with its fixed contacts. This results in novel circuit arrangements for those switches commonly called "individual" and "connector" switches.

It will be of course understood that in developing the invention along the lines indicated, I have provided features and circuit arrangements which are capable of use in various other relations. Some of these are applicable to manual and so-called semi-automatic systems, as well as to full automatic systems.

The invention contemplates other features and arrangements which, together with the above, will be more fully understood upon reference to the following detailed description, taken in connection with the accompanying drawing, which illustrates one embodiment of my invention.

Referring to said drawing, Figure 1, which includes sheets 1, 2 and 3, is a diagram of a portion of a system constructed in accordance with my invention; Fig. 2 is a side elevation of a private or individual switch with which each automatically equipped line is provided at the exchange; Fig. 3 is an elevation of the movable contacts or wipers and the fixed or bank contacts of said switch; Fig. 4 is a view partly in section, illustrating the arrangement of said wipers on their supporting shaft; Fig. 5 is a partial sectional view of a connector switch, illustrating in plan the primary magnet, together with its associated mechanism, the section being taken on a plane indicated by line 5—5 of Fig. 9; Fig. 6 is a side elevation of the connector, illustrating particularly the secondary magnet and its associated mechanism, together with the arrangement of the wipers and bank contacts; Fig. 7 is a detail of the off-normal switch associated with said connector; Fig. 8 is a sectional view of the contact bank of said connector; Fig. 9 is an elevation of said connector, viewed at right angles to that of Fig. 6; Fig. 10 is an elevation viewed from the right of Fig. 9 and illustrating the private and release magnets of the connector and their associated mechanism; Figs. 11 and 12 are detail views illustrating the actuating magnets of control switch mechanism included between the private switch mechanism and the first selector; Fig. 13 illustrates the release magnet of a selector switch, together with its associated switching mechanism; and Fig. 14 is a side elevation of such a selector.

Referring to said drawing and more particularly to the diagram of Fig. 1, A designates the substation equipment of automatically equipped lines, and B the substation equipment of manually equipped lines. Each of these lines terminates at the exchange in the multiple jacks 10 of the manual portion of the system and in multiple fixed contacts 11—12 of connector switches G of the automatic portion of the system. In addition, each automatically equipped line is normally connected to the movable contacts 14—15 of an individual switch C. Manual connection between a manually equipped calling line and any other line, whether automatically or manually equipped, is obtained by means of the manually operated link-circuit apparatus H. Automatic connection is obtained between an automatically equipped calling line and any other line through the agency of electrically operated switch and link-circuit mechanism including the individual switch C of the calling line, the control switch mechanism D, the first selector switch E, second selector switch F and the connector switch G. In practice, it is found that on a basis of ten thousand lines these switches may be apportioned as follows: ten thousand individual switches C, one thousand control switch mechanisms D and selector switches E, one thousand second selector switches F and one thousand connector switches G. With this apportionment, each line will be multipled to ten connectors, each connector to one hundred second selectors, each second selector to a thousand first selectors, and each first selector to ten private switches. It is, of course, to be understood that where an ultimate capacity of only one thousand lines is desired, one set of selector switches may be omitted, and it should also be understood that the above figures form a basis upon which extensions to existing manual systems of automatic equipment may be made, and that the automatic equipment may be added from time to time, according to the requirements of the service.

With the above preliminary outline of the system, it is thought it will be best understood by entering at once into a statement of its operation. The manual portion of the system illustrated is old and well known in the art and, therefore, the operation of establishing connection between manually equipped calling and called lines need be described but briefly. Assuming that a party at substation B at the left in Sheet 3 of Fig. 1 desires to converse with a party at station B at the right in said figure, he removes his receiver 16 from its hook 17 and thereby completes a circuit from ground at the exchange, over the line limb 18, through the switch-hook 17, receiver 16, transmitter 19, line limb 20, winding of the line relay 21, battery 22 to ground, thereby completing a circuit to ground through the line lamp 23 and causing it to light, as a signal to the operator that connection is desired. Upon observing this signal, the operator will insert the answering plug 24 into the answering jack 10 associated with the calling line and depress her listening-key 25 to learn the wishes of the calling party. The insertion of the plug 24 into the jack will complete a circuit from the live pole of the battery 26, through the sleeve relay 27 of the link-circuit apparatus H, through the plug and jack contacts and the winding of the cut-off relay 29 to ground, thereby energizing said cut-off relay to remove the control of the line relay 21 and its associated signal 23 from the control of the calling party and to continue the line limbs 18 and 20 to the jack contacts. As soon as the cut-off relay 29 is energized, a circuit will be completed in shunt thereto by way of the line limbs 18—20, plug and jack contacts and the winding of the tip relay 30 to ground. Over this latter branch, sufficient current will flow to energize the relay 30 and thereby interrupt the circuit of the supervisory lamp 31 and prevent its display. With the parts in this condition, the breaking of the circuit at the substation, by the return of the receiver to its hook, would interrupt the flow of current through the tip relay 30 and allow its contact to return to normal, while enough current would flow through the sleeve relay 27 to maintain it actuated and thereby maintain the circuit of the supervisory lamp 31 complete. The operator, having made this connection, now depresses her listening-key 25 and thereby includes her telephone set in circuit with the calling station and, after learning the desires of the calling party, tests the called line to determine its busy or idle condition by touching the tip of her calling plug 32 against the test contact of the jack 10 of the called line.

If the line is busy by reason of connection with a manually operated link-circuit, it will be seen from the circuit traced through the cut-off relay 29 of the calling line that there will be a potential above that of ground upon the test contact of the jack and consequently, as soon as the tip of the calling plug is touched thereto, a flow of current will result through the normal contact 33 of the supervisory sleeve relay 34 and the winding of the test relay 35 to ground. This will momentarily close the contacts of the latter relay and supply current to the induction coil of the operator's set to cause the customary "click" in her receiver to indicate the busy condition of the tested line. In case the called line is automatically connected, a like potential will be found on the test contact of the jack supplied over connections hereinafter indicated. If the desired line is found to be idle, the operator will insert the calling plug 32 into the jack 10 of said line and thereby actuate the cut-off relay 29 of that line to establish connection between the line limbs and the jack contacts and to destroy the substation control of the line relay and signal. Upon establishing this connection, the operator will depress the ringing key 36 and thereby apply ringing current to actuate the call-bell of the desired party and, at the same time, supply battery current to the cut-off relay 29 over the sleeve side of the circuit. As soon as the ringing key is restored to normal, the supervisory lamp 37 will be lighted and will remain in this condition until the called party answers. This occurs by reason of the energization of the relay 34 over a circuit through the cut-off relay of the called line, similar to that traced in connection with the calling line. However, as soon as the call is answered, a path will be completed through the winding of the tip supervisory relay 38 and sufficient current will be supplied to actuate said relay to break the circuit of the supervisory lamp 37 and cause its extinguishment. With the parties thus connected, both supervisory lamps 31 and 37 remain dark; and at the end of conversation, the lighting of both lamps is a signal to the operator to disconnect, resulting from the restoration of the subscribers' receivers.

Referring now to the operation of the automatic portion of the system; assuming that a party at substation A at the left of Fig. 1 desires to converse with a party at substation A at the right of said figure, and assuming that the number of the latter's telephone is 3456, the party at the former station first takes down his receiver and, by that act, sets the individual switch C, associated with his line, into operation to automatically select an idle link-circuit and its associated first selector switch. The removal of the receiver 39 from its switch-hook 40 completes a bridge between the two line limbs P—S, through the transmitter 41 and the normally closed contacts 42 of the calling device T. At this time, the wipers 14 and 15 of the private switch are in engagement respectively with the ground contact 43 and the contact 44 which is permanently included in circuit with the winding of the primary magnet PM of said switch and the battery 45. Since the line limbs P and S are normally continued through the contacts of the cut-off relay CO to the wipers 14—15, as soon as the calling party removes his receiver, circuit is completed from the live pole of the battery 45, through the winding of the primary magnet PM, contacts 44—15, contacts 46—47, line limb S, through the substation, line limb P, cut-off relay contacts 48—49, wiper 14 and contact 43 to the grounded side of the battery. The closing of this circuit will energize the relay PM to attract its armature contacts 50—51 into engagement with the contacts 52—53 respectively. The closing of the contacts 50—52 will complete a circuit from the live pole of the battery through the winding of the secondary magnet SM, which automatically interrupts its energizing circuit at the contacts 54—55, and, through the agency of the mechanism associated therewith and disclosed in Fig. 2, steps the wipers 14, 15 and 56 of the switch over the associated bank contacts. The bank contacts 43 and 44 are of sufficient length to remain in engagement with the wipers 14 and 15 respectively after they have been moved one step, while the grounded contact 57, which coöperates with the wiper 56, is not engaged thereby until the switch has taken one step. Upon the first step of the private switch C, the spring contact 58 of the off-normal switch O moves from engagement with the spring contact 59 into engagement with the spring contact 60, while the spring contacts 61 and 62, which are normally in engagement, are disengaged and moved into engagement respectively with the contacts 63 and 64. Thereupon a circuit is completed from the live pole of the battery, through the contacts 50 and 52 of the primary magnet PM, switch contacts 60—58, 64—62 and the winding of the cut-off relay CO to ground. At the same time, connection is established from the live pole of the battery, through the resistance 65, contacts 63—61 to the bank contacts 12 of the connected connector switch and to the test contacts of the connected spring jacks 10, thus raising their potential to indicate, upon test, the busy condition of the line.

The closing of the circuit through the cut-off relay CO energizes it to interrupt the normal connection of the line limbs P and S to the wipers 14 and 15 and thereby prevents possible interference with conversation over busy link-circuits having multiple contacts over which the wipers 43—44 are required to pass. Since the breaking of this connection interrupts the original circuit through the winding of the primary magnet PM, it is necessary to provide another circuit for said winding. This is obtained through the contacts 53—51 of said magnet, the wiper 56 and the grounded contact 57. Consequently, the magnet PM remains energized at the time the wipers are in their second position; and through the instrumentality of the magnet SM, the wipers are stepped into their third position, into engagement with the first set of bank contacts 66, 67 and 68. If the link-circuit connected to these contacts be in use, a multiple of the contact 68 will be connected to ground, through the wiper 56, contacts 51—69 and the winding of the release magnet RM of another individual switch. Consequently, the circuit of the primary magnet PM will remain unbroken and the wipers will be moved another step. This step-by-step movement will continue until the wiper 56 engages a contact 68 of an idle link-circuit. Upon such engagement, the circuit through the primary magnet will be opened, and its contacts 50 and 51 will return to normal, the former interrupting the circuit of the secondary magnet SM and the circuit of the cut-off magnet CO, and the latter placing ground on the contacts 68 of the link-circuit thus connected, thus making it "busy" to other calling lines. It will be noted that when the cut-off relay CO is energized, its armature contacts 47 and 48, by engaging fixed contacts 69 and 70, connect the line limbs S—P to the connected bank contacts 11 and 12 respectively. From this it will be seen that the operation of the individual switch C, resulting from the calling party's removal of his receiver from its hook, automatically connects his line to an idle link-circuit, places potential on the contacts 12 of the connector switches associated with said line, and grounds the contacts 68 of the selected link-circuit.

The next step in the calling operation consists in moving the dial 71 of the calling mechanism T until three of the teeth 72 (corresponding to the thousands digit in the number 3456) pass below the contact spring 73, and then allowing it to return to normal under the tension of the spring 74. Upon its return, contact springs 73 and 75 will be engaged three times and this will be followed by a single engagement of the contact springs 76 and 77, since, in the normal position of the disk, one tooth lies below the spring 76. The three engagements of the springs 73 and 75 send three impulses of current over the line limb P, while the single engagement of the springs 76 and 77 sends a single impulse over the line limb S. At the time these impulses are being transmitted, the bridge through the transmitter 41 is interrupted at the contacts 42 which separate when the dial 71 is moved from its normal position. The three impulses transmitted over the line limb P energize and deënergize the primary relay PR three times, while the following single impulse over the line limb S energizes the secondary relay SR once. The circuit for the primary relay extends from the live pole of the battery, through the winding of said relay, the normally closed contacts 78 and 79 of the control switch CS, the link-circuit strand 80, individual switch contacts 66—14, relay contacts 48—49, line limb P, contacts 73—75 to ground at 81. The corresponding circuit for the secondary relay SR extends from the live pole of the battery 45 through the winding of said relay, the normally closed contacts 82—83 of the switch CS, the link-circuit strand 84, individual swtich contacts 67—15, line limb S, to ground at 81. Each impulse transmitted through the primary relay PR transmits corresponding impulses through the winding of the primary magnet PM² of the first selector switch E. This circuit may be traced from the live pole of the battery 85, through the winding of magnet PM², normally closed contacts 86—87 of the release magnet RM² of said selector, normally closed contacts 88 and 89 of the off-normal switch O' associated with the first selector E and contacts 90—91 of the primary relay PR to ground.

The selector switch is so constructed that its wipers 92, 93 and 94 are given a primary movement in one direction, followed by a secondary movement at an angle thereto. By the primary movement, the wipers are brought opposite a level or group of bank contacts connected to corresponding selector switches and, by its secondary movement, an idle second selector switch is selected. Thus, in response to the three impulses transmitted from the primary relay PR, the primary magnet PM², through the agency of its associated mechanism hereinafter described, causes the wipers 92, 93 and 94 to be stepped to the third level of bank contacts which are those assigned for connection to the third thousand group of subscribers' lines. The following impulse transmitted over the line limb S, which energizes the secondary relay SR, closes a momentary circuit from ground at the contact 91 of said relay, through the contact 95, contacts 96—97 of the off-normal switch O', the winding of the private relay 98 to the live pole of the battery 85, thereby energizing said relay to break the normal contacts 99—100, 101—102, 103—104, and to close contacts 103—105 and 106—104. By the first primary movement of the selector switch E, the contacts 107—108 are mechanically separated and the contacts 107—109 closed. At the same time, contacts 110 and 111 are brought into engagement. Consequently, as soon as the private magnet 98 is energized, current will flow over a circuit including the winding of the secondary magnet SM², the contacts 110ᵃ—110ᵇ, 105—103, 109—107 and 110—111 to ground. The magnet SM², by reason of its vibratory circuit and its mechanical connection with the wipers 92, 93 and 94, steps them over the coöperating bank contacts 112, 113 and 114. As soon as the circuit of the private relay 98 is interrupted, its contacts are returned to their normal positions and consequently the circuit of the secondary magnet SM² is interrupted and the stepping of the switch ceases. Therefore, while the wipers are passing over busy contacts, an energizing circuit for the magnet 98 is maintained. If any encountered contact 112 is that of a busy link-circuit, it will be connected to ground through one of its multiple contacts, the wiper 92 of another selector switch, and over a circuit of said switch to ground, as follows: through the normally engaged contacts 112ᵃ—113 of the release magnet RM², contacts 104—103 of the private relay, contacts 109—107 and contacts 110—111. Therefore, as long as the wiper 92 of the selecting switch engages a grounded contact 112, the private relay 98 will be energized over a circuit from the live pole of the battery 85, through the winding of said relay, contacts 106—104, 113—112ᵃ, wiper 92 and contact 112 to ground. As soon, however, as an idle link-circuit is encountered, this circuit will be interrupted and the further progress of the switch stayed, thus completing connection from the calling station, over the heavily marked circuit to the contacts 113—114 of the link-circuit connecting with an idle second selector switch F. In the operation of the selector switch E, it will be noticed that the wipers 93 and 94 were disconnected from the circuit by the contacts 99—100, 101—102 of the private relay 98 while passing over the contacts 113—114 of busy link-circuits, thus preventing interference with conversation through contacts in multiple therewith.

The next step in the calling operation consists in again moving the dial 71 far enough to bring four teeth (corresponding to the hundreds digit in the number 3456) below the contact spring 73 and then allowing it to return to normal, thereby transmitting four impulses over the line limb P to actuate the primary relay PR four times. This, as before, will be followed by a single impulse over the line limb S which will actuate the secondary relay SR once. These impulses will cause the second selector switch F to move its wipers 115, 116 and 117 to the fourth level or group of bank contacts 118, 119 and 120, which are assigned for connection to the fourth hundred group of subscribers' lines and thence into engagement with an idle link-circuit connecting with an idle connector switch G having access to the called subscriber's line. The four energizations of the primary relay PR cause four closures of a circuit from ground at the contact 91 of said relay, through contact 90, contacts 99—100, wipers 93—113, contacts 121—122 of the off-normal switch O², contacts 123—124 of the release magnet RM³, the winding of the primary magnet PM³ to the live pole of the battery 85.

The impulses transmitted through the magnet PM³ are instrumental in producing the primary movement of the wipers 115, 116 and 117. The first movement from normal will cause the contact 125 to disengage the contact 126 and engage the contact 127; and in addition, will cause the contacts 128 and 129 to engage, and the contacts 130 and 131 to engage. The impulse transmitted by the secondary relay SR will close a circuit from ground at the contact 91, through contact 95, contacts 101—102, wiper 94, contact 114, contacts 132—133 of the off-normal smitch O², winding of the private relay 133 of the second selector switch F to the live pole of the battery 85, thereby energizing said relay and causing it to disconnect the wipers 116—117 from circuit by separating the contacts 134—135 and the contacts 136—137, while at the same time breaking contacts 138—139 and closing contacts 138—140 and contacts 141—139. The energization of the private relay 133 thus completes a circuit for the secondary magnet SM³, by which the wipers 115, 116 and 117 are given their secondary movement. This circuit extends from the live pole of the battery 85, through the winding of said magnet SM³, contacts 140ᵃ—140ᵇ, 140—138, 127—125, 128—129 to ground. By reason of the vibratory character of this circuit, the secondary magnet SM³ will step the wipers around over their associated bank contacts until its circuit is interrupted. This occurs, as previously indicated in connection with the description of the first selector switch E, when an idle link-circuit is encountered. At this time, as previously indicated, the wipers 116—117 are again included in circuit, thus projecting the circuit of the calling line through the individual switch C of said line and selected switch mechanism D, E, F and G.

The next step in the calling operation consists in moving the dial 71 into a position to transmit five impulses over the line limb P through the primary relay PR, followed by a single impulse over the line limb S through the secondary relay SR. The primary impulses are extended from the primary relay over a circuit extending from ground at said relay to the wiper 93 of the first selector switch E, as previously traced, thence through the contact 113, contacts 135, 134, wiper 116, contact 119, contacts 142—143 of the off-normal switch O³ of the connector, contacts 144—145 of the release magnet RM⁴ of said connector, through the winding of the primary magnet PM⁴ to the live pole of the battery 146. In this instance the five impulses of current transmitted through the primary magnet, will step the wipers 147—148 to the fifth level of contacts to which subscribers' lines, having numbers from 50 to 59 inclusive, are connected. At the first movement of the switch in response to these primary impulses, the switch contacts 147ᵃ—147ᵇ are moved into engagement, thereby grounding the associated bank contacts 118 through the winding of the release magnet RM⁴. The secondary impulse following these primary impulses closes a circuit from ground at the contact 91 of the secondary relay SR, to the wiper 94 of the first selector switch E, as previously traced, thence through contact 114, contacts 136—137, wiper 117, contact 120, contacts 149—150 of the off-normal switch O³, contacts 151—152 of the release magnet RM⁴, winding of the secondary magnet SM⁴ to the live pole of the battery 146. This causes a momentary energization of the secondary magnet SM⁴, which is instrumental in giving the wipers one step in their secondary direction.

As indicated in Fig. 6, the wipers are normally two steps distant from the first set of bank contacts and consequently this single step does not bring them into engagement, but is occasioned for the purpose of actuating the off-normal switch contacts 142—143. At this time, the contact 142 is moved from engagement with the contact 143 into engagement with the contact 153; and at the same time, the contact 149 is moved out of engagement with the contact 150. The contact 149 is not moved into engagement with the contact 154 until the next step of the switch. This is to prevent the above secondary impulse from being transmitted through the upper winding of the busy relay 160 by way of the contacts 159—158, which might occur if the contact 149 were thrown at once into engagement with contact 154ᵃ.

The next step in the calling operation consists in moving the dial 71 so as to transmit primary impulses, again followed by a single secondary impulse. In this case, the circuit under the control of the primary relay PR is the same as that heretofore traced, as far as the contact 119. Thence it extends through the contacts 142—153 of the off-normal switch O³, contacts 155—156 of the control relay 157, through the winding of the secondary magnet SM⁴ to the live pole of the battery. Thus the secondary magnet is energized and deënergized six times, thereby stepping the wipers 147—148 into engagement with the sixth pair of contacts in the fifth level, thus establishing connection with the fixed contacts 11 and 12 of the desired line which, we have assumed, is that running to substation A shown at the right in sheet 3 of Fig. 1. The secondary impulse which follows the six primary impulses is extended by the secondary relay SR to the contact 120 of the second selector switch F, over a path the same as that heretofore traced. From this point, its circuit is continued through the contacts 149—154 of the off-normal switch O³, contacts 158—159 of the control relay 157, the upper winding of the relay 160, which controls the application of the busy signal, to the live pole of the battery 146. The completion of this circuit momentarily energizes the relay 160 to close its contacts 161—162 and 163—164, thus momentarily applying busy current to the line. In case the desired line is in use, we have seen that a potential above that of ground will exist on the contacts 12 connected therewith. Consequently, if the called line is busy, at this time, a path for current will be completed from the engaged contact 12, through the wiper 148, switch contacts 165—166, contacts 167—168 of the release magnet RM⁴, contacts 161—162 of the busy relay 160, through the lower winding of said relay to ground. The windings on this relay are so arranged at this time that their effect will be cumulative and consequently the contacts of the relay will be locked in their alternate position, thus applying said busy signal to the line. This may be accomplished in any preferred manner, but in the present instance is obtained by means of an interrupter I included in a primary circuit with one winding of an induction coil 169 and with the battery 146. The secondary circuit extends from ground at the battery 146, through said battery, the secondary winding of the induction coil 169, the condenser 170, relay contacts 163—164, off-normal switch contacts 154—149, second selector switch contacts 120—117, relay contacts 137—136, first selector switch contacts 114—94, relay contacts 102, 101, condenser 171, individual switch contacts 67—15, relay contacts 46—47, line limb S, contacts 42 of the calling device T, transmitter 41, switch-hook 40, line limb P, relay contacts 48—49, individual switch contacts 14—66, control switch contacts 79—78, winding of the primary relay PR, battery 45 to ground. The current induced in this secondary circuit will produce the customary "click" in the receiver of the calling party, as an indication to him that the called line is busy. In case the called line is not busy, the final secondary impulse transmitted from the calling station will only momentarily energize the busy relay 160 and will therefore, at the most, apply only a momentary busy signal which may be disregarded by the calling party. Upon the deënergization of this relay, its mechanical construction is such, as will be hereinafter more fully explained, as to cause a movement of the contact 165 from engagement with the contact 166 and into engagement with the contact 172, thereby completing a circuit from the live pole of the battery 146, through the winding of the control relay 157, contacts 172—165, wiper 148, contact 12, contacts 61—62 of the off-normal switch O associated with the called line, through the winding of the cut-off relay CO to ground, thereby actuating both relays. The actuation of the cut-off relay completes the connection of the line limbs S—P, through the contacts 48—69 and 47—70 to the connector switch contacts 11 and 12, while at the same time disconnecting said line limbs from the movable contacts or wipers 14—15 of its individual switch. By means of this circuit, a potential above that of ground exists at the multiple contacts 12 as well as the test contacts of the jacks 10, thereby rendering the line busy to either manual or automatic connection. The energization of the relay 157 interrupts the circuit of the secondary magnet SM⁴ at the contacts 155—156 and completes the strands of the talking circuit at this point at the contacts 155—173 and 158—174. At the same time, the grounded contact 175 is brought into engagement with the contact 176 which completes a circuit through the normally closed contacts 177—178, the winding of the ringing relay 179, to the live pole of the battery 146, thereby actuating the relay 179 and completing a circuit from the live pole of the battery 146, through the resistance 180, contacts 181—182, wiper 148, contact 12, off-normal switch contacts 61—62, winding of the cut-off relay CO to ground, thus supplying battery current to maintain the relay energized while ringing current is supplied to the line. The path for the latter extends from the generator G, through the interrupter I', the lower winding of the relay 183, contacts 184—185 of the ringing relay 179, wiper 147, contact 11, contacts 69—48, line limb P, switch-hook 40, call-bell 186, condenser 187, line limb S, contacts 47—70, and thence to ground by way of contacts 12—148, 181—182, resistance 180, battery 146, or by way of the off-normal switch contacts 61—62 and the winding of the cut-off relay CO, thereby actuating the call-bell as a signal to the called party. By means of the interrupter I', ringing current is intermittently transmitted from the generator G; and during the non-transmitting intervals, the circuit is grounded at 188.

The relay 183 is so constructed that the passage of the ringing current from the generator through its winding will not move its contacts from normal position. In addition to applying ringing current to the called line, the energization of the control relay 157 completes a circuit for the control magnet CM, associated with the switch mechanism D, over a path extending from the live pole of the battery 45, through the winding of said magnet, through the contacts 189—190 of the control switch CS, contacts 191—90 of the primary relay PR, contacts 99—100 of the private relay 98, first selector switch contacts 93—113, relay contacts 135—134, secondary switch contacts 116—119, off normal switch contacts 142—153, relay contacts 155—192, release magnet contacts 193—194, contacts 195—196 of the release relay RR⁴, to ground. The completion of this circuit energizes the control magnet CM which is constructed so as to actuate the switch contacts of the control switch CS upon its deënergization. As soon as the called party removes his receiver from its hook, thereby completing a conductive bridge between the line limbs S and P through his transmitter, a circuit is completed from the live pole of the battery, through resistance 180, contacts 182—181, wiper 148, contact 12, relay contacts 70—47, line limb S, through the substation, line limb P, relay contacts 48—69, contact 11, wiper 147, contacts 184—185, through the lower winding of relay 183 and the interrupter I' to ground. The flow of current over this circuit is sufficient to cause the relay 183 to move its contacts to their alternate position, thereby completing the adjacent portions of the link-circuit strands at the contacts 197—198 and 199—200, interrupting the circuit through the ringing relay at the contacts 177—178 and bringing contacts 178 and 201 into engagement. The breaking of the ringing relay circuit discontinues the application of ringing current to the called line, while the engagement of the contacts 178—201 completes a circuit from the live pole of the battery 146, through the upper winding of the relay 183, contacts 201—178, 176—175, to ground, thereby maintaining the contacts of the relay 183 in their actuated positions. As soon as the relay 183 is actuated, transmission current for the called line is supplied over a circuit extending from the live pole of the battery 146, through the winding of the control relay 157, switch contacts 172—165, wiper 148, contact 12, out over the line limb P, through the substation, back over the line limb S, contact 11, wiper 147, contacts 200—199, the winding of the release relay RR⁴ to ground. Upon the completion of this circuit, the relay RR⁴ is energized to break the circuit through the control magnet CM at the contacts 195—196, thereby allowing the said magnet CM upon its deënergization to move the contacts of the control switch CS to their alternate position, thereby again interrupting the circuit of the magnet CM at the contacts 189—190, connecting the adjacent portion of the link-circuit strands at contacts 79—202 and 83—203, and interrupting the normal circuit through the primary and secondary relays PR and SR. Transmission current is furnished to the calling line from the battery 45 over a path leading from its live pole, through the upper windings of the relays 204 and 205, control switch contacts 202—79, individual switch contacts 66—14, line limb P, through the transmitter 41 at the substation, line limb S, wiper 15, contact 67, control switch contacts 83—203, and the lower windings of the relays 205 and 204 to ground. The windings on the relay 205 are serially arranged so that, upon the movement of the control switch contacts to their alternate positions, said relay is energized to close its contacts and thereby close the final break in the talking circuit between the connected stations. By this means, the talking circuit remains open until the called party responds. This is of value where the substations are equipped with pay station devices. The windings of the relay 204 are wound in opposition so that, upon the closure of the circuit just traced, its contacts are not disturbed. By means of the condensers 206—207 in the strands of the link-circuit associated with the connector G, the ends of said circuit are conductively separated, but permitting the passage of voice currents. A talking circuit is thus established between the calling and the called stations, as indicated by the heavy lines of the diagram.

In order to restore the parts to normal position at the end of conversation, it is only necessary for either or both parties to hang up their receivers. Associated with each switch-hook 40 are contact springs 208, 209 and 210, 208 and 209 being connected respectively to the line limbs S and P, and 210 being grounded. When the receiver is removed from the switch-hook, a projection 211 passes over the upper end of the spring 208 without causing an engagement of contacts; but upon the return of the receiver to the switch-hook, the springs 208, 209 and 210 are forced into engagement, thereby grounding both line limbs at the substation. It will be remembered that the circuit for supplying transmission current to the calling station extends from the live pole of the battery 45, through the upper windings of relays 204 and 205, thence over the heavily marked circuit, through the substation, and back through the lower windings of the relays 205 and 204 to ground. Therefore, when the calling subscriber restores his receiver to the switch-hook and thereby grounds both line limbs, the normal balance of the relay 204 is destroyed, and the release magnet RM' is energized over a circuit extending from the live pole of the battery 45, through the winding of said magnet and the contacts of the relay 204 to ground. On the other hand, it will be remembered that the circuit for supplying transmission current to the called line extends from the live pole of the battery 146, through the winding of the relay 157, switch contacts 172—165, out over the line, through the substation, and back through the winding of the release relay RR⁴ to ground. Therefore, the restoration of the called party's receiver to its hook interrupts the circuit and thereby closes the contacts 195—196 of the relay RR⁴ and thus completes a circuit from ground at said contacts, through contacts 194—193 of the release magnet RM⁴, contacts 192—155 of the control magnet 157, over one side of the heavily marked circuit, to the upper contact of the relay 205, thence through the upper winding of said relay and the relay 204 to the live pole of the battery 45, thus providing an unbalancing circuit for the relay 204 from the called station to cause the energization of the release magnet RM'. The energization of the release magnet RM' closes a circuit from the live pole of the battery 85, through the winding of the release magnet RM², the contacts of the release magnet RM', contact 68, wiper 56, contacts 51—69 of the primary magnet of the individual switch C, and the winding of the release magnet RM of said switch to ground. The energization of the release magnet RM² in turn completes a circuit from the live pole of the battery 85, through the protective resistance 212, contacts 213—112ᵃ of the magnet RM², wiper 92, contact 112, contacts 130—131, winding of the release magnet RM³ to ground. The energization of this latter magnet in turn completes a circuit from the live pole of the battery 85, through the protective resistance 214, contacts 215—216 of the magnet RM³, wiper 115, contacts 118, 147ᵃ—147ᵇ, and the winding of the release magnet RM⁴ of the connector switch G to ground. From this, it will be seen that it is necessary to maintain the unbalancing circuit of the magnet 204 from the calling station until the release magnets RM, RM', RM², RM³, and RM⁴ have attracted their armatures. The energization of the release magnet RM of the individual switch C closes the contacts a—b, c—d in bridge of the contacts of the cut-off relay CO; and, as will more fully appear hereinafter, returns the off-normal switch contacts 58, 59 and 60 to their normal positions, thereby completing a circuit from the live pole of the battery 45, through the resistance 65, contacts 59—58, 64—62 and the winding of the cut-off relay CO to ground. The cut-off relay CO is thus energized to break the circuit through its contacts 46—47, 48—49, and the closed contacts of the release magnet RM maintain the unbalancing circuit from the calling station for the magnet 204. As soon as ground is removed at the calling station, the contacts of the relay 204 are restored to normal and each of the release magnets RM, RM', RM², RM³ and RM⁴ is deënergized. Upon the deënergization of the release magnet RM, the wipers 14, 15 and 56 return to their normal positions. In so doing, they pass over the multiple contacts of other link-circuits and, by reason of the disconnection of the wipers from the line, interference with conversation over any of these link-circuits is prevented. As soon as the wipers reach their normal positions, the contacts 61—62, 63—64, of the off-normal switch are returned to their normal positions and the circuit of the cut-off relay CO is thereby interrupted, and the normal connection of the line with its wipers again established. At the first selector switch E, the energization of the release magnet RM² moves the switch contacts 107, 108 and 109 to their normal positions, thus energizing the private magnet 98 over a circuit extending from the live pole of the battery 85, through the winding of said magnet, contacts 108—107 and 110—111 to ground.

The energization of the private magnet disconnects the wipers of the switch from the line so as to prevent interference with conversation over multiply connected link-circuits, as previously indicated. At the same time, the energization of the release magnet, by closing its contacts f—g, bridges the opening at the contacts 99—100 and thereby maintains the unbalancing circuit from the called station through this switch. In a similar manner, the wipers 116—117 of the second selector switch F are disconnected and the unbalancing circuit is maintained by the closure of the contacts h—i. Upon the deënergization of the release magnet RM', the contacts of the control switch CS are returned to normal position. Likewise, upon the deënergization of the release magnets RM², RM³, of the selector switches, their parts are restored to normal. Where the balance of the magnet 204 is destroyed by the return of the called subscriber's receiver to its hook, the unbalancing circuit is interrupted at the contacts 193—194 of the release magnet RM⁴ as soon as the energizing circuit is completed therethrough by the action of the release magnet RM³ of the second selector switch. The deënergization of the release magnet RM⁴ restores the connector to its normal position. As previously pointed out, during connection there is a circuit from the live pole of the battery 146, through the winding of the control magnet 157, switch contacts 172—165, wiper 148, contact 12, contacts 61—62 and the winding of the cut-off relay to ground. As soon as the wiper 148 leaves the contact 12 upon the return of the switch, this circuit is interrupted and the cut-off relay contacts are allowed to return to normal to establish connection between the called line and the wipers 14—15 of its individual switch C. The contacts of the control magnet 157 also return to normal and thereby interrupt the circuit through the upper winding of the relay 183, thereby deënergizing said relay. The energization of the release magnet RM⁴ also restores the switch contacts 165, 166 and 172 to normal. In case the above releasing operation takes place in response to a busy signal transmitted to the calling line, then the energization of the release magnet RM⁴ interrupts the locking circuit of the busy relay 160 at the contacts 167—168, thereby interrupting the secondary circuit of the induction coil 169. If the calling party desires to restore the mechanism at the exchange to normal at any time prior to the completion of connection with the called line, the restoration of his receiver will simultaneously energize the primary relay PR and the secondary relay SR over circuits which have been traced heretofore. As previously indicated, these circuits remain intact until the called party responds to the call. Upon the simultaneous energization of both relays PR and SR, their contacts k—l will be moved into engagement and a circuit thereby completed from the live pole of the battery 85, through the winding of the release magnet RM² of the first selector switch E, relay contacts l—k, contacts 68—56 of the individual switch C, contacts 51—69 and the winding of the release magnet RM to ground. Upon the deënergization of the release magnets RM and RM², both of the first selector switch and the individual switch will be restored to normal in the manner previously indicated and, as before, the release of the switch E will occasion the release of the second selector F and the connector G, should they be in circuit at the time.

With reference to establishing connection between a manually equipped calling line and an automatically equipped called line, it will be observed that the cut-off relay CO of the automatically equipped line is included in circuit between the sleeve contact of the jacks 10 and ground, while the line limbs are normally disconnected from the jack contacts the same as in the manually equipped line illustrated. Therefore, upon inserting the calling plug 32 into a jack 10 associated, for example, with the line S—P, current will flow from the sleeve contact of the jack, through the normally closed contacts 61—62 of the off-normal switch O and the winding of the cut-off relay CO to ground, thereby extending the line limbs to the jack contacts. From this it will be seen that the operation of establishing connection by means of the manually operated link-circuit H with an automatically equipped called line is the same as that previously described in connection with a manually equipped called line. The restoration of the mechanism to normal at the end of conversation will also be the same, since at the automatically equipped called line the restoration of the receiver to its hook breaks the bridge through the transmitter and closes that through the call-bell in the same manner as at the manually equipped substation. Similarly, upon establishing connection between an automatically equipped calling line and a manually equipped called line, the engagement of the wiper 148 of the connector with one of the contacts 12, associated with said called line, will complete a circuit through the control magnet 157 and the cut-off relay 29 in a manner similar to that described in connection with an automatically equipped called line. Thus the cut-off relay 29 will be actuated and a called line circuit, substantially the same as that of the automatically equipped line, will be established. At the end of conversation, the restoration of the receiver to its hook by the called party will have the same effect upon the interconnecting apparatus as that described in connection with an automatically equipped called line.

Obviously, in the practice of the system above outlined, any preferred mechanical construction may be employed for performing the switching functions indicated. However, I preferably employ the switch mechanism illustrated in the drawings.

Referring first to the individual switch C, the fixed contacts 57, 43, 44, 66, 67, 68 are arranged in a bank 217, mounted upon a suitable support such as the metal plate 218, carried upon any suitable framework 219. The contacts in the bank are insulated from each other in any suitable manner, such as indicated in Fig. 8, and the contacting ends are arranged in an arc in a position to be engaged by the wipers 14, 15 and 56, which are suitably mounted upon, and insulated from, a supporting shaft 220, normally held in the position indicated by the spiral retractile spring 221, contained in a casing 222 and havng one end secured to the fixed support 223. As illustrated, the wiper 56 is made double and is adapted to straddle the middle row of contacts 68, while the outer wipers 14 and 15 engage the contacts 66 and 67 respectively. The fixed contacts 43 and 44, as clearly illustrated, engage the wipers 14 and 15 in the first and second positions in the manner previously described. All the wipers and contacts are provided with suitable terminals for the connection of circuit wires. The portion of the shaft 220, on the opposite side of the plate 218 from the wipers, is rotatably mounted on the bracket 224 and is provided with a ratchet member 225 readily secured thereto. The ratchet teeth on this member are adapted to be engaged by the retaining pawl 226 to hold the shaft in its various operating positions. An actuating pawl 227 coöperates with the ratchet member to rotate the shaft step by step. The ratchet member 225 is also provided with a projection 228 which normally holds the springs 61, 62, 63 and 64 of the off-normal switch O in the position illustrated. When this projection is moved from its normal engagement with the stop 229, the contact springs are moved to their alternate positions by reason of their inherent spring tension. The remaining springs 58, 59 and 60 are held in the position illustrated by the spring member 230 which is carried by the armature 231 of the release magnet RM carried upon the plate 218. The upper end of the retaining pawl 226 is adapted to pass through an opening in the spring member 230. This opening is so placed that when the relay RM is energized the member 230 will slide along over the end of the pawl until the opening is reached, and the end of the pawl will then pass into the opening; and upon the deënergization of the relay, pawl 226 will be carried out of engagement with the teeth of the ratchet member 225. This is the position illustrated. As soon as the end of the pawl passes into the opening in the member 230, the latter engages the contact spring 58 to restore it to its normal position. This movement of the switch contacts, it should be noted, is done upon the attraction of the armature 231 and not upon its retraction. In order to free the retaining pawl 226 from the member 230, said member is provided with an inclined projection 232 which is adapted to be engaged by a friction roller carried at the end of an arm 233, forming an extension of the armature 234 of the secondary magnet SM. This armature also carries the actuating pawl 227. Upon the first attraction of the armature 234, the spring member 230 is moved upward out of engagement with the end of the retaining pawl 226, and the latter is allowed to move into operative position under the tension of its spring. The plate 218 carries the contacts 54 and 55 which are caused to interrupt the circuit of the secondary magnet SM. This plate also carries the primary magnet PM and the cut-off relay CO with their associated contacts, as well as the associated contacts of the release magnet RM. From the above it will be seen, that the first impulse transmitted through the secondary magnet SM will place the retaining pawl 226 into operative position and begin the step-by-step movement of the wipers; that upon the energization of the release magnet RM, the spring 58 will be returned to its normal position; the retaining pawl 226 will be engaged by the member 230 preparatory to its removal from operative position; and that upon the deënergization of said magnet, such removal will take place.

Referring now to the connector switch G, which is illustrated in Figs. 5 to 10 inclusive, 235 designates a suitable supporting frame for the switch mechanism, which includes the primary magnet PM⁴, secondary magnet SM⁴, the release magnet RM⁴, the magnet 160 for controlling the busy signal, and, if desired, an additional magnet such as the ringing relay magnet 179. The frame also carries the fixed contacts 11—12 which are arranged in a bank 236 with their free ends adapted for the attachment of connecting wires and having their contacting inner ends terminating in a spherical surface. These contacts are suitably insulated from each other in the manner illustrated in Fig. 8, by the insulating strips 237 supported on a frame 238. At the center of the spherical surface formed by the inner ends of the bank contacts, the wipers 147 and 148 are pivoted to the lower end of a rotary shaft 239, carried by the frame 235. The wipers are rotatable with the shaft in a horizontal direction and, in addition, may be rotated vertically about their pivot 240 through the agency of an additional longitudinally movable shaft 241 having a broad foot 242 which engages a rearward projection 243 on the wipers. Thus by rotating the shaft 239, the wipers may be given their primary movement to the desired level or group of bank contacts and, by subsequently giving the shaft 241 a longitudinal movement, the wipers may be moved to the desired bank contact in the selected level. The foot 242 on the shaft 241 is made sufficiently large to engage the projection 243, no matter what the position of the wipers may be. The mechanism associated with the primary magnet PM⁴, for giving the shaft 239 its primary or rotary movement, comprises an actuating pawl 244 carried by the armature 245 and adapted to engage the teeth of the ratchet wheel 246 to step the shaft around. The shaft is retained in its various positions by the retaining pawl 247, which is adapted to engage the teeth of the ratchet wheel. The upper end of the shaft 239 carries a member 248 having a projection 249 which normally maintains the contacts 147ᵃ and 147ᵇ out of engagement; but upon the first movement of the shaft, allows them to contact. The secondary magnet SM⁴, through the agency of its armature 250, actuating pawl 251 and the ratchet teeth 252 on the shaft 241, steps the latter downward to carry the contacting ends of the wipers into their desired positions. A suitable retaining pawl 253 engages the teeth 254 on the shaft 241 to hold it in its different operating positions. The shaft is also provided with a spline 255 which, after the first movement of the shaft, engages the teeth of the ratchet wheel 246 to lock the shaft 239 against rotation. The contact springs 142, 143, 149, 150, 153 and 154 are normally held against their spring tension in the position illustrated in Fig. 1, through the agency of a projection 256 carried at the upper end of the shaft 241. The outer end of this projection normally engages a pin 257 to hold the spring contacts in this position. The spring 142, which normally engages the spring contact 153, moves into engagement with the spring contact 143 upon the first step of the shaft 241; while the spring 149, which is normally in engagement with the spring 150, does not engage the spring 154 until the shaft 241 has been moved two steps. This is brought about by properly spacing the springs, as illustrated in Figs. 6 and 9. The armature 258 of the magnet 160, also carried by the frame 235 when attracted, brings the contact springs 161—162, 163—164, into engagement. Similarly, the armature 259 of the release magnet RM⁴, when energized, separates the normally engaged contacts 193—194, 144—145, 151—152, 167—168. The armatures 258 and 259 also coöperate in the control of the spring-contacts 165, 166 and 172. These parts are illustrated in their normal position in Fig. 10 and, as previously pointed out, the contact 165—166 is broken and the contact 165—172 made upon the retraction of the armature 258, while the parts are restored to normal upon the energization of the release magnet RM⁴. This is brought about through the agency of an arm 260 carried at the free end of the armature 258 and having its outer end forced upward by a spring 261. Upon the attraction of the armature 258, a projection 262 on the arm 260 passes to the left of a block 263 carried by the spring 165; and upon the retraction of the armature 258, the right hand shoulder on the projection 262, by engaging the left face of the block 263, forces the spring 165 to its alternate position. In order to release the parts, the armature 259 of the release magnet RM⁴ is provided with an arm 264, whose outer end overhangs the outer end of the arm 260 so that, upon the attraction of the armature, the outer end of the arm 264 is drawn downward so as to free the projection 262 from the block 263, to allow the return of the spring 165 to its normal position.

In order to restore the wipers to normal after they have been once moved to an operative position, it is only necessary to disengage the retaining pawls 247 and 253, whereupon, through the agency of a spiral spring 265, located about the pivot 240, the shaft 241 will be restored to normal; and through the agency of a spiral spring 266 contained in a casing 267, the shaft 239 and wipers will be restored to normal. As illustrated in Figs. 5 and 9, the retaining pawl 253 is pivoted in a bracket 268 carried by the frame 235, and is forced into engagement with the shaft 241 by the spring 269. The tail 270 of this pawl normally rests against the under side of a downwardly depressed member 271, pivotally secured to the lower end of the armature 259 at the release magnet RM⁴ and movable therewith. Similarly, the tail 272 of the retaining pawl 247 rests against the under side of this member 271. Said member is provided with openings 273 and 274 which are adapted to slip over the tails of the pawls 253 and 247 respectively when the armature 259 reaches its attracted position. From this, it will be seen that when the release magnet RM⁴ is deënergized and its armature 259 retracted, the member 271 will remain in engagement with the pawls and draw them out of operative position. The pawls and the member 271 remain in this engaging relation while the connector switch is not in use. At the beginning of the operation of the switch, however, and at the first impulse transmitted through the primary magnet PM⁴, the engagement of the member 271 with the pawls is broken and they are allowed to return to their active positions. This latter is accomplished through the agency of a lever 275 pivoted at 276 and having one end pressed by a spring 277 into engagement with the end of the primary magnet armature 245. The opposite end of the lever 275 is provided with an upturned end 278, having a friction roller 279 which normally rests against the under side of the member 271 and which, upon the first movement of the armature 245, is rocked against the inclined face 280 on the under side of the member 271 to force said member upward out of engagement with the retaining pawls.

The selector switches E and F partake of the general character of the connector switch G, just described. Figs. 13 and 14 illustrate a selector switch with the contact arrangement of the second selector switch F. In this instance, there are three wipers which coöperate with three sets of bank contacts in the same manner as the wipers and contacts of the individual switch C. The contacts in this case, however, are arranged in spherical formation as in the connector switch, and the wiper are given their movement through the agency of primary and secondary magnets in the same manner, except that the secondary magnet is provided with a vibratory circuit. The mechanical arrangement for accomplishing the movements in such a circuit may be of any preferred kind. In the present instance, the armature 250, which is the same as that of the connector switch, is adapted to make and break the contacts 140ª and 140ᵇ. In this instance also, the wipers are normally only one step from the first bank contacts, while in the connector they are two steps distant. Upon the first rotary or primary movement of the selector, the contact springs 128, 129, 130 and 131 are allowed to move from their normal positions, illustrated in Fig. 1, to their alternate position, in the same manner as the springs 147ª and 147ᵇ of the connector are allowed to engage. Similarly too, upon the first downward movement of the shaft 241, by which the wipers are given their first secondary step, the contacts 121—122, 132—133 are moved to their alternate positions. In the selector also, the release magnet RM³ is provided with a pawl engaging member 271, which, upon the deënergization of the release magnet, draws the pawl out of operative position. In this instance, the pawls are released from engagement with the member 271 by a lever mechanism similar to that described in connection with the connector switch upon the first actuation of the primary relay. In the present instance, the upturned end 278 of the lever 275 does not engage the member 271 directly, but through an intermediate lever 281. This member is normally pressed by a spring 282 into a position to engage, by a catch 283, the lower end of the contact spring 125. This spring normally tends to move into engagement with the spring 127, but when engaged by the member 281, is held in engagement with the contact spring 126. This latter position is the normal position of the springs. Upon the first energization of the primary magnet by which the primary and secondary retaining pawls are released, the catch 283 also disengages the spring 125 and allows it to move to its alternate position. It remains in this position until the switch is restored to normal by the operation of the release magnet RM³. For this purpose, an arm 284, carried by the armature of the magnet and extending at its outer end into a position to engage the far side of the spring 125, is provided. Upon the energization of the release magnet, this arm draws the spring 125 into engagement with the spring 126 and it is retained there by the catch 283. The first selector switch E is substantially the same as the second selector switch F, but as indicated in the diagram, is provided with fewer contact springs operated upon its first primary movement.

The mechanism by which the actuating magnet CM and the release magnet RM′ operate upon the contacts of the control switch CS, is illustrated in Figs. 11 and 12. As previously pointed out, the contacts of this switch are moved to their alternate positions upon the deënergization of the magnet CM, and are restored to their normal positions upon the deënergization of the release magnet RM'. The spring arrangement of this switch is illustrated in Fig. 12, wherein the insulating spacers 285 and 286, carried at the upper end of the lever 287 of the magent CM, are adapted to move the contacts to their alternate positions. The armature 288 of this magnet carries a spring pressed arm 289 which is provided with a catch 290 at its outer end, adapted to engage the lower end of the lever 287. Normally, the catch 290 is in non-engaging position. Upon the attraction of the armature 288, the arm 289 is moved far enough to allow the catch 290 to engage the lever 287; and upon the retraction of the armature, the lever is rocked about its pivotal support, so as to force the spacers 285 and 286 and thereby move the springs to their alternate positions. Coöperating with the arm 289 is a spring-pressed member 291, carried by the armature 292 of the release magnet RM'. With the spring contacts in their alternate positions, the end of the arm 289, adjacent to the armature 288, will engage the side of the member 291. With the parts in this position, upon the attraction of the armature 292 of the release magnet, the member 291 will be drawn downward past the end of the arm 289, so as to engage the under side of its projecting end. Then upon the retraction of the armature 292, the member 291 will rock the arm 289 about its pivot 293 and thereby release the lever 287, which, on account of the peculiar shape and the resiliency of the springs 79, 83 and 190, will return to its normal position, together with the contact springs of the switch.

Obviously, in carrying out my invention, many alterations and modifications may be made in the circuit arrangements and in the mechanical construction of the switches and relays without departing from the spirit and scope of my invention. Obviously too, the various interconnecting switches may be located at adjacent or distant points. With this in view, I have used the term "exchange" in the accompanying claims in its broad sense. I, therefore, do not wish to be limited to the specific matter disclosed herein, but aim to cover by the terms of the appended claims all modifications which legitimately come within the scope of the invention.

What I claim as new and desire to secure by Letters Patent of the United States is:—

1. A combined manual and automatic telephone system, comprising a plurality of telephone lines, part provided only with manual and part only with automatic substation equipment, manually operated link-circuit apparatus for establishing connection for conversational purposes between a manually equipped calling line and any other desired line and electrically actuated link-circuit apparatus for automatically establishing connection for conversational purposes between an automatically equipped calling line and any other desired line.

2. A combined manual and automatic telephone system comprising a plurality of telephone lines, part provided only with manual and part with automatic substation equipment, exchange talking and operating battery supply for said system, manually operated link-circuit apparatus for establishing connection for conversational purposes between a manually equipped calling line and any other desired line, means for indicating to the operator the busy condition of any called line sought to be manually conected to, and automatic switch mechanism associated with the lines having said automatic substation equipment and controlled by said equipment to extend the circuits of said lines.

3. A combined manual and automatic telephone system comprising a plurality of telephone lines, part provided with manual and part with automatic substation equipment, automatically operated link-circuit apparatus under the control of said automatic substation equipment for establishing connection for conversational purposes between an automatically equipped calling line and any other desired line, and means for automatically indicating to the calling subscriber the busy condition of any called line sought to be automatically connected.

4. A combined manual and automatic telephone system comprising a plurality of telephone lines, part provided with manual and part with automatic substation equipment, multiple spring jacks and multiple switch contacts for each of said lines, link circuits and connecting plugs for manually establishing connection for conversational purposes between different lines, means for indicating to the operator the busy condition of a called line sought to be thus connected, automatic interconnecting means for making connection with said contacts and means for automatically indicating to a calling subscriber at an automatically equipped substation the busy condition of a called line sought to be thus automatically connected.

5. A combined manual and automatic telephone system comprising a plurality of telephone lines, part provided with manual and part with automatic substation equipment, multiply connected spring jacks and multiply connected switch contacts for each of said lines, link-circuits and connecting plugs for manually establishing connection for conversational purposes between different lines, means for indicating to the operator the busy condition of a called line sought to be thus connected, automatic interconnecting means comprising a pair of wiper contacts for engaging a pair of the said switch contacts of a called line to establish conversational connection therewith, and means for indicating to a calling subscriber at an automatically equipped substation the busy condition of the called line sought to be thus automatically connected.

6. A combined manual and automatic telephone system comprising a plurality of telephone lines, part provided with manual and part with automatic substation equipment, multiply connected spring jacks and multiply connected switch contacts for each of said lines, link-circuits and connecting plugs for manually establishing connection for conversational purposes between different lines, means for indicating to the operator the busy condition of a called line sought to be thus connected, automatic interconnecting means comprising a pair of wiper contacts for engaging a pair of the said switch contacts of a called line to establish conversational connection therethrough, and means dependent upon the electrical condition of the pair of the encountered contacts to indicate to a calling subscriber at an automatically equipped substation the busy condition of the called line sought to be thus automatically connected.

7. A combined manual and automatic telephone system comprising a plurality of telephone lines, part provided with manual and part with automatic substation equipment, multiply connected spring jacks and multiple connected switch contacts for each of said automatically equipped lines, link-circuits and connecting plugs for manually establishing connection for conversational purposes between a manually equipped calling line and an automatically equipped called line, means for indicating to the operator the busy condition of the called line sought to be thus connected, automatic interconnecting means comprising a pair of wiper contacts for engaging a pair of the said switch contacts of a called automatically equipped line to establish conversational connection therewith, means for indicating to a calling subscriber at an automatically equipped substation the busy condition of the called line sought to be thus automatically connected, and a centralized source of operating and talking current.

8. A combined manual and automatic telephone system comprising a plurality of telephone lines, part provided with manual and part with automatic substation equipment, multiply connected spring jacks and multiply connected switch contacts for each of said automatically equipped lines, link-circuits and connecting plugs for manually establishing connection for conversational purposes between a manually equipped calling line and an automatically equipped called line, means for indicating to the operator the busy condition of the called line sought to be thus connected, automatic interconnecting means comprising a pair of wiper contacts for engaging a pair of the said switch contacts of a called automatically equipped line to establish conversational connection therewith, and means dependent upon the electrical condition of the encountered pair of contacts to indicate to a calling subscriber at an automatically equipped substation the busy condition of the called line sought to be thus automatically connected.

9. A combined manual and automatic telephone system comprising a plurality of telephone lines, part provided with manual and part with automatic substation equipment, multiply connected spring jacks and multiply connected switch contacts for each of said manually equipped lines, link-circuits and connecting plugs for manually establishing connection for conversational purposes between manually equipped lines, means for indicating to the operator the busy condition of a called line sought to be thus connected, automatic interconnecting means comprising a pair of wiper contacts for engaging a pair of the said switch contacts of a called manually equipped line to establish conversational connection therewith, and means for indicating to a calling subscriber at an automatically equipped substation the busy condition of the called line sought to be thus automatically connected.

10. A combined manual and automatic telephone system comprising a plurality of telephone lines, part provided with manual and part with automatic substation equipment, multiply connected spring jacks and multiply connected switch contacts for each of said manually equipped lines, link-circuits and connecting plugs for manually establishing connection for conversational purposes between manually equipped lines, means for indicating to the operator the busy condition of a called line sought to be thus connected, automatic interconnecting means comprising a pair of wiper contacts for engaging a pair of the said switch contacts of a called manually equipped line to establish conversational connection therewith, and means dependent upon the electrical condition of the encountered pair of contacts to indicate to a calling subscriber at an automatically equipped substation the busy condition of the called line sought to be thus automatically connected.

11. An automatic telephone system comprising telephone lines extending from substations to an exchange, a pair of terminal contacts for each of said lines at the exchange, interconnecting mechanism operated from a calling station to establish connection with the pair of terminal contacts of a called line to complete a conversational circuit therethrough and means initially operated from the calling station and dependent for its continued operation upon the electrical condition of the encountered pair of contacts to indicate to the calling party the busy condition of the called line.

12. An automatic telephone system comprising telephone lines extending from substations to an exchange, a pair of terminal contacts for each of said lines at the exchange, interconnecting mechanism operated from a calling station to establish connection with the pair of terminal contacts of the called line to complete a conversational circuit therethrough, an interrupter for transmitting a busy signal to the calling party, means initially operated from the calling station and sensitive to a potential upon an encountered contact of said pair other than that of ground for rendering said interrupter inoperative to transmit its signal.

13. An automatic telephone system comprising telephone lines extending from substations to an exchange, a pair of terminal contacts for each of said lines at the exchange, interconnecting mechanism operated from a calling station to establish connection with the pair of terminal contacts of the called line to complete a conversational circuit therethrough, an interrupter for transmitting a busy signal to the calling party, a relay for controlling said interrupter, and means for initially actuating said relay from the calling station and maintaining it actuated upon the engagement of said interconnecting means with a live contact of the pair of contacts of said called line.

14. An automatic telephone system comprising telephone lines extending from substations to an exchange, a pair of talking contacts for each of said lines at the exchange, interconnecting mechanism operated from a calling station to establish connection with the pair of talking contacts of a called line to complete a conversational circuit therethrough, an interrupter for transmitting a busy signal to the calling party, a relay for controlling said interrupter, means for momentarily actuating said relay from the calling station and means dependent upon the condition of said talking contacts only for maintaining said relay in its actuated position in case the called line be busy.

15. An automatic telephone system comprising a plurality of telephone lines, interconnecting link-circuits, switching mechanism including coöperating movable and fixed contacts for automatically connecting a calling and a called line for conversation, and means initially operated from the calling station and dependent for its continued operation upon the electrical condition of a talking contact of the called line to indicate to the calling party the busy condition of the called line.

16. A combined manual and automatic telephone system comprising a plurality of telephone lines, part provided only with manual and part only with automatic substation equipment, electrically actuated link-circuit apparatus for automatically completing connection for conversational purposes between an automatically equipped calling line and a manually equipped called line, and means for automatically restoring the interconnecting apparatus to normal at the end of conversation.

17. A combined manual and automatic telephone system comprising a plurality of telephone lines, part provided only with manual and part only with automatic substation equipment, manually operated link-circuit apparatus for establishing connection for conversational purposes between a manually equipped calling line and an automatically equipped called line, supervisory apparatus under the control of the manually connected substations for signaling the operator to disconnect, electrically actuated link-circuit apparatus for automatically completing connection for conversational purposes between an automatically equipped calling line and a manually equipped called line, and means for automatically restoring the included interconnecting apparatus to normal at the end of conversation.

18. A combined manual and automatic telephone system comprising a plurality of telephone lines, part provided with manual and part with automatic substation equipment, movable terminals normally connected to each automatically equipped line, manually operated link-circuit apparatus for establishing connection for conversational purposes between a manually equipped calling line and an automatically equipped called line, and means actuated during the establishment of said connection to destroy the normal connection between the called line and its movable contacts.

19. A combined manual and automatic telephone system comprising a plurality of telephone lines, part provided only with manual and part only with automatic substation equipment, line signals associated with the manually equipped lines and normally under the control of the subscribers, electrically actuated link-circuit apparatus for automatically completing connection for conversational purposes between an automatically equipped calling line and a mannally equipped called line, and means actuated during the establishment of said connection to destroy the substation control of the called line line signal.

20. A combined manual and automatic telephone system comprising a plurality of telephone lines, part provided with manual and part with automatic substation equipment, line signals associated with the manually equipped lines and normally under the control of the subscribers, movable terminals normally connected to each automatically equipped line, manually operated link-circuit apparatus for establishing connection for conversational purposes between a manually equipped calling line and an automatically equipped called line, means actuated upon the establishment of said manual connection to destroy the normal connection between the called line and its movable contacts, electrically actuated link-circuit apparatus for automatically completing connection for conversational purposes between an automatically equipped calling line and a manually equipped called line, and means actuated during the establishment of said automatic connection to destroy the substation control of the called line line signal.

21. An automatic telephone system comprising a plurality of telephone lines, interconnecting link-circuits, a plurality of electrically operated switches for connecting said link-circuits in a normally discontinuous talking circuit between a calling and a called line, relay mechanism under the control of the calling party for controlling the operation of a plurality of said switches, and a control switch under the control of the called party for interrupting the circuit of said relay mechanism and for completing the talking circuit between the calling and called stations.

22. An automatic telephone system comprising a plurality of telephone lines, interconnecting link-circuits, a plurality of electrically operated switches for connecting said link-circuits into a partially completed talking circuit between a calling and a called line, relay mechanism under the control of the calling party for controlling the operation of a plurality of said switches, an electromagnet, means for energizing said electro-magnet in response to movements of said switches, means under the control of the called party for deënergizing said electro-magnet, and switching means actuated upon the deënergization of said electro-magnet to complete the talking circuit between the calling and called stations and to interrupt the circuit of said relay mechanism.

23. A telephone system comprising a plurality of telephone lines extending from substations to an exchange, normally discontinuous link-circuits for interconnecting calling and called lines, electrically operated switching mechanism for establishing connection between a calling line and one end of an idle link-circuit, means for connecting the other end of said link-circuit to a called line, relay mechanism under the control of the calling party for controlling the operation of said electrically operated switching mechanism, and a control switch under the control of the called party for interrupting the circuit of said relay mechanism and rendering the connected link-circuit continuous to complete the talking circuit between the calling and called stations.

24. A telephone system comprising a plurality of telephone lines extending from substations to an exchange, normally discontinuous link-circuits for interconnecting calling and called lines, electrically operated switching mechanism for establishing connection between a calling line and one end of an idle link-circuit, means for connecting the other end of said link-circuit to a called line, relay mechanism under the control of the calling party for controlling the operation of said switching mechanism, an electro-magnet, means for energizing said electro-magnet during the operation of establishing said connection, means under the control of the called party for deënergizing said electro-magnet, and switching means actuated upon the deënergization of said electro-magnet to interrupt the circuit of said relay mechanism and to render the connected link-circuit continuous to complete the talking circuit between the calling and called stations.

25. A telephone system comprising a plurality of telephone lines extending from substations to an exchange, normally discontinuous link-circuits for interconnecting calling and called lines, electrically operated "selector" switching mechanism for establishing connection between the calling line and one end of an idle link-circuit, means for connecting the other end of said link-circuit to a called line, and a control switch associated with said "selector" switching mechanism and under the control of the called party for rendering the connected link-circuit continuous at its normally discontinuous point to complete the talking circuit between the calling and called stations.

26. A telephone system comprising a plurality of telephone lines extending from substations to an exchange, normally discontinuous link-circuits for interconnecting calling and called lines, electrically operated "selector" switching mechanism for establishing connection between a calling line and one end of an idle link-circuit, means for connecting the other end of said link-circuit to a called line, an electromagnet associated with said "selector" switching mechanism, means for energizing said electromagnet during the operation of establishing said connection, means under the control of the called party for deënergizing said electro-magnet, and switching means actuated upon the deënergization of said electro-magnet to render the connected link-circuits continuous at its normally discontinuous point to complete the talking circuit between the calling and called stations.

27. An automatic telephone system comprising a plurality of lines extending from substations to an exchange, fixed and movable switch contacts for said lines at the exchange, link-circuits and electrically operated switching mechanism for establishing a talking circuit through the movable contacts of a calling line and the fixed contacts of an idle called line, a relay for destroying the normal connection of said called line with its movable switch contacts, and means operative upon the engagement of said switching mechanism with said called line contacts to actuate said relay by completing a circuit through one of the said fixed talking contacts of said line.

28. An automatic telephone system comprising a plurality of lines extending from substations to an exchange, fixed and movable switch contacts for said lines at the exchange, link-circuits and electrically operated switching mechanism for establishing a conversational circuit through the movable contacts of a calling line and the fixed contacts of an idle called line, a relay for destroying the normal connection of said called line with its movable switch contacts, a relay for completing a portion of a talking circuit between the connected substations, and means operative upon the engagement of said switching mechanism with said called line contacts to actuate said relays by completing a circuit through one of the engaged called line talking contacts.

29. An automatic telephone system comprising a plurality of lines extending from substations to an exchange, fixed and movable switch contacts for said lines at the exchange, link-circuits and electrically operated switching mechanism for establishing a talking circuit through the movable contacts of a calling line and the fixed contacts of an idle called line, a relay for destroying the normal connection of each line with its movable switch contacts, means operative upon the engagement of said switching mechanism with said called line contacts to actuate the relay of said line by completing a circuit through one of the engaged called line talking contacts, and means for preventing the completion of such a circuit through the corresponding relay of the calling line.

30. An automatic telephone system comprising a plurality of lines extending from substations to an exchange, fixed and movable switch contacts for said lines at the exchange, link-circuits and electrically operated switching mechanism for establishing a talking circuit through the movable contacts of a calling line and the fixed contacts of an idle called line, a relay for destroying the normal connection of each line with its movable switch contacts, means operative upon the engagement of said switching mechanism with said called line contacts to actuate the relay of said line by completing a circuit through one of the engaged called line talking contacts, and means, operative after the initial movement of said switch mechanism toward establishing said talking circuit, to prevent the completion of such a circuit through the corresponding relay of the calling line.

31. An automatic telephone system comprising a plurality of lines extending from substations to an exchange, fixed and movable contacts for said lines at the exchange, link-circuits and electrically operated switching mechanism for establishing connection through the movable contacts of a calling line and the fixed contacts of an idle called line, a relay for destroying the normal connection of said called line with its movable switch contacts, means operative upon the engagement of said switching mechanism with said called line contacts to actuate said relay and to automatically supply ringing current to said called line by completing a circuit through one of the engaged called line talking contacts.

32. An automatic telephone system comprising a plurality of lines extending from substations to an exchange, fixed and movable contacts for said lines at the exchange, link-circuits and electrically operated switching mechanism for establishing connection through the movable contacts of a calling line and the fixed contacts of an idle called line, a relay for destroying the normal connection of said called line with its movable switch contacts, means operative upon the engagement of said switching mechanism with said called line contacts to actuate said relay and to automatically supply ringing current to said called line by completing a circuit through one of the engaged called line talking contacts, and means under the control of the called party to discontinue the supply of ringing current.

33. An automatic telephone system comprising a plurality of lines extending from substations to an exchange, fixed and movable contacts for said lines at the exchange, link-circuits and electrically operated switching mechanism for establishing connection through the movable contacts of a calling line and the fixed contacts of an idle called line, a relay for destroying the normal connection of said called line with its movable switch contacts, means for supplying ringing current, a relay for controlling the application of said ringing current to said called line, means operative upon the engagement of said switching mechanism with said called line contacts to actuate said relays by completing a circuit through one of the engaged called line talking contacts.

34. An automatic telephone system comprising a plurality of lines extending from substations to an exchange, fixed and movable contacts in which each of said lines terminates at the exchange, link-circuits and electrically operated switching mechanism for establishing connection through the movable contacts of a calling line and the fixed contacts of an idle called line, a relay for destroying the normal connection of said called line with its movable switch contacts, means for supplying ringing current, a relay for controlling the application of said ringing current to said called line, means operative upon the engagement of said switching mechanism with said called line contacts to actuate said relays by completing a circuit through one of the engaged called line talking contacts, and a relay under the control of the called party for disconnecting the ringing current supply.

35. An automatic telephone system comprising a plurality of lines extending from substations to an exchange, fixed and movable contacts for said lines at the exchange, link-circuits and electrically operated switching mechanism for establishing connection through the movable contacts of a calling line and the fixed contacts of an idle called line, a relay for destroying the normal connection of said called line with its movable switch contacts, a source of ringing current, a second relay for controlling the application of said ringing current to said called line, a third relay for controlling the energization of said second relay, and means operative upon the engagement of said switching mechanism with said called line contacts to actuate said third relay and said first mentioned relay by completing a circuit through one of the engaged line talking contacts.

36. An automatic telephone system comprising a plurality of lines extending from substations to an exchange, fixed and movable contacts for said lines at the exchange, link-circuits and electrically operated switching mechanism for establishing a connection through the movable contacts of a calling line and the fixed contacts of an idle called line, a relay for destroying the normal connection of said called line with its movable switch contacts, a source of ringing current, a second relay for controlling the application of said ringing current to said called line, a third relay for controlling the energization of said second relay, means operative upon the engagement of said switching mechanism with said called line contacts to actuate said third relay and said first mentioned relay by completing a circuit through one of the engaged line talking contacts, and means under the control of the called party for disconnecting the ringing current supply and completing the talking circuit between the lines.

37. A telephone system comprising a plurality of lines extending from substations to an exchange, fixed and movable contacts for said lines at the exchange, link-circuits for interconnecting calling and called lines, electrically operated switching mechanism for establishing a connection between the movable contacts of a calling line and one end of an idle link-circuit, means for connecting the other end of said link-circuit to the fixed contacts of an idle called line, a relay for destroying the normal connection of said called line with its movable contacts, and means operative upon the connection of said link-circuit to said called line contacts to actuate said relay by completing a circuit through one of the engaged talking contacts of said line.

38. A telephone system comprising a plurality of lines extending from substations to an exchange, fixed and movable contacts for said lines at the exchange, normally discontinuous link-circuits for interconnecting calling and called lines, electrically operated switching mechanism for establishing a connection between the movable contacts of a calling line and one end of an idle link-circuit, means for connecting the other end of said link-circuit to the fixed contacts of an idle called line, a relay for destroying the normal connection of said called line with its movable switch contacts, a relay for completing a portion of the connected normally discontinuous link-circuit, and means operative upon the connection of said link-circuit to said called line contacts to actuate said relays by completing a circuit through one of the engaged called line talking contacts.

39. A telephone system comprising a plurality of lines extending from substations to an exchange, fixed and movable contacts for said lines at the exchange, link-circuits for interconnecting calling and called lines, electrically operated switching mechanism for establishing a connection between the movable contacts of a calling line and one end of an idle link-circuit, means for connecting the other end of said link-circuit to the fixed contacts of an idle called line, a relay for destroying the normal connection of each line with its movable contacts, means operative upon the connection of said link-circuit to said called line contacts to actuate said relay by completing a circuit through one of the engaged talking contacts of said line, and means for preventing the completion of such a circuit through the corresponding relay of the calling line.

40. A telephone system comprising a plurality of lines extending from substations to an exchange, fixed and movable contacts for said lines at the exchange, link-circuits for interconnecting calling and called lines, electrically operated switching mechanism for establishing a connection between the movable contacts of a calling line and one end of an idle link-circuit, means for connecting the other end of said link-circuit to the fixed contacts of an idle called line, a relay for destroying the normal connection of each line with its movable contacts, means operative upon the connection of said link-circuit to said called line contacts to actuate the relay of said line by completing a circuit through one of the engaged called line talking contacts, and means, operative after the initial movement of said switching mechanism toward establishing connection with an idle link-circuit, to prevent the completion of such a circuit through the corresponding relay of the calling line.

41. A telephone system comprising a plurality of lines extending from substations to an exchange, fixed and movable contacts for said lines at the exchange, link-circuits for interconnecting calling and called lines, electrically operated switching mechanism for establishing a connection between the movable contacts of a calling line and one end of an idle link-circuit, means for connecting the other end of said link-circuit to the fixed contacts of an idle called line, a relay for destroying the normal connection of said called line with its movable contacts, means operative upon the connection of said link-circuit to said called line contacts to actuate said relay and to automatically supply ringing current to said called line by completing a circuit through one of the engaged called line talking contacts.

42. A telephone system comprising a plurality of lines extending from substations to an exchange, fixed and movable contacts for said lines at the exchange, link-circuits for interconnecting calling and called lines, electrically operated switching mechanism for establishing a connection between the movable contacts of a calling line and one end of an idle link-circuit, means for connecting the other end of said link-circuit to the fixed contacts of an idle called line, a relay for destroying the normal connection of said called line with its movable contacts, means operative upon the connection of said link-circuit to said called line contacts to actuate said relay and to automatically supply ringing current to said called line by completing a circuit through one of the engaged called line talking contacts, and means under the control of the called party to discontinue the supply of ringing current.

43. A telephone system comprising a plurality of lines extending from substations to an exchange, fixed and movable contacts for said lines at the exchange, link-circuits for interconnecting calling and called lines, electrically operated switching mechanism for establishing a connection between the movable contacts of a calling line and one end of an idle link-circuit, means for connecting the other end of said link-circuit to the fixed contacts of an idle called line, a relay for destroying the normal connection of said called line with its movable contacts, means for supplying ringing current, a relay for controlling the application of said ringing current to said called line, and means operative upon the connection of said link-circuit to said called line contacts to actuate said relays by completing a circuit through one of the engaged called line talking contacts.

44. A telephone system comprising a plurality of lines extending from substations to an exchange, fixed and movable contacts for said lines at the exchange, link-circuits for interconnecting calling and called lines, electrically operated switching mechanism for establishing a connection between the movable contacts of a calling line and one end of an idle link-circuit, means for connecting the other end of said link-circuit to the fixed contacts of an idle called line, a relay for destroying the normal connection of said called line with its movable contacts, means for supplying ringing current, a relay for controlling the application of said ringing current to said called line, means operative upon the connection of said link-circuit to said called line to actuate said relays by completing a circuit through one of the engaged called line talking contacts, and a relay under the control of the called party for disconnecting the ringing current supply.

45. A telephone system comprising a plurality of lines extending from substations to an exchange, fixed and movable contacts for said lines at the exchange, link-circuits for interconnecting calling and called lines, electrically operated switching mechanism for establishing a connection between the movable contacts of a calling line and one end of an idle link-circuit, means for connecting the other end of said link-circuit to the fixed contacts of an idle called line, a relay for destroying the normal connection of said called line with its movable contacts, a source of ringing current, a relay for controlling the application of said ringing current to said called line, an additional relay for controlling the energization of said latter relay, and means operative upon the connection of said link-circuit to said called line contacts to actuate said additional relay and said first mentioned relay by completing a circuit through one of the engaged line talking contacts.

46. A telephone system comprising a plurality of lines extending from substations to an exchange, fixed and movable contacts for said lines at the exchange normally discontinuous link-circuits for interconnecting calling and called lines, electrically operated switching mechanism for establishing a connection between the movable contacts of a calling line and one end of an idle link-circuit, means for connecting the other end of said link-circuit to the fixed contacts of an idle called line, a relay for destroying the normal connection of said called line with its movable contacts, a source of ringing current, a relay for controlling the application of said ringing current to said called line, an additional relay for controlling the energization of said latter relay, means operative upon the connection of said link-circuit to said called line contacts to actuate said additional relay and said first mentioned relay by completing a circuit through one of the engaged line talking contacts, and means under the control of the called party for disconnecting the ringing current supply and rendering the connected link-circuit continuous to complete the talking circuit between the connected stations.

47. A telephone system comprising telephone lines extending from substations to an exchange, a pair of terminal contacts for each of said lines, a link-circuit for interconnecting the said contacts of calling and called lines to establish a talking circuit therethrough, busy signal transmitting means, a source of ringing current, means for connecting said busy signal transmitting means to the connected calling line, means dependent upon the electrical condition of the said connected called line talking contacts for continuing the connection of said busy signal transmitting means to the calling line in case said called line is busy, and to discontinue said connection and to connect said source of ringing current to the called line in case said called line is idle.

48. A telephone system comprising telephone lines extending from substations to an exchange, a pair of terminal contacts for each of said lines, a link-circuit for interconnecting the said contacts of calling and called lines to establish a talking circuit therethrough, an interrupter for causing a busy signal, a relay for controlling the connection of said interrupter to the calling line circuit, a source of ringing current, a relay for controlling the application of said ringing current to the line, and means dependent upon the electrical condition of the said connected talking called line contacts for energizing the interrupter control relay upon one condition of said contacts and for automatically actuating the ringing current control relay only upon another condition of said contacts.

49. A telephone system comprising telephone lines extending from substations to an exchange, a pair of terminal contacts for each of said lines, a link-circuit for interconnecting the said contacts of calling and called lines to establish a talking circuit therethrough, an interrupter for causing a busy signal, a relay for controlling the connection of said interrupter to the calling line circuit, a source of ringing current, a relay for controlling the application of said ringing current to the line, and means for actuating the interrupter control relay upon connection with a called line contact having potential above that of ground and for actuating said ringing current control relay upon connection with a called line contact having a potential the same as that of ground.

50. A telephone system comprising telephone lines extending from substations to an exchange, talking contacts for each of said lines, a link-circuit for interconnecting the said contacts of calling and called lines to establish a talking circuit therethrough, an interrupter for causing a busy signal, a relay for controlling the connection of said interrupter to the calling line circuit, means for momentarily energizing said relay to cause its actuation, and means dependent upon the condition of said talking contacts only for maintaining said relay in its actuated position if connection has been made to a busy called line.

51. A telephone system comprising telephone lines extending from substations to an exchange, terminal contacts for each of said lines, a link-circuit for interconnecting the said contacts of calling and called lines to establish a talking circuit therethrough, an interrupter for causing a busy signal, a relay for controlling the connection of said interrupter to the calling line circuit, means for momentarily energizing said relay to cause its actuation, and means for completing a locking circuit for said relay through one of the talking contacts of said called line.

52. A telephone system comprising telephone lines extending from substations to an exchange, talking contacts for each of said lines, a link-circuit for interconnecting the said contacts of calling and called lines to establish a talking circuit therethrough, an interrupter for causing a busy signal, a relay for controlling the connection of said interrupter to the calling line circuit, means for momentarily energizing said relay to cause its actuation, means dependent upon the condition of said talking contacts only for maintaining said relay in its actuated position if connection has been made to a busy called line, and means actuated upon the release of said relay to apply ringing current to the called line.

53. A telephone system comprising telephone lines extending from substations to an exchange, talking contacts for each of said lines, a link-circuit for interconnecting the said contacts of calling and called lines to establish a talking circuit therethrough, an interrupter for causing a busy signal, a relay for controlling the connection of said interrupter to the calling line circuit, means for momentarily energizing said relay to cause its actuation, means for completing a locking circuit for said relay through one of the talking contacts of said called line if said called line is busy, a source of ringing current, a relay for controlling the application of said ringing current to the called line, and means actuated upon the release of said interrupter control relay to complete a circuit for said ringing current control relay through one of the contacts of said called line.

54. A telephone system comprising telephone lines extending from substations to an exchange, talking contacts for each of said lines, a link-circuit for interconnecting the said contacts of calling and called lines to establish a talking circuit therethrough, an interrupter for causing a busy signal, a relay for controlling the connection of said interrupter to the calling line circuit, means for momentarily energizing said relay to cause its actuation, means dependent upon the condition of said talking contacts only for maintaining said relay in its actuated position if connection has been made to a called line, a source of ringing current, a relay for controlling the application of said ringing current to the called line, and means actuated upon the release of said interrupter control relay to actuate said ringing current control relay.

55. A telephone system comprising telephone lines extending from substations to an exchange, talking contacts for each of said lines, a link-circuit for interconnecting the said contacts of calling and called lines to establish a talking circuit therethrough, an interrupter for causing a busy signal, a relay for controlling the connection of said interrupter to the calling line circuit, means for momentarily energizing said relay to cause its actuation, and a control device permanently connected to a talking strand of said link-circuit and operated upon the de-energization of said relay, to vary the connections with the talking circuit.

56. A telephone system comprising telephone lines extending from substations to an exchange, a pair of terminal contacts for each of said lines, a link-circuit for interconnecting the said contacts of calling and called lines to establish a talking circuit therethrough, an interrupter for causing a busy signal, a relay for controlling the connection of said interrupter to the calling line circuit, a source of ringing current, a relay for controlling the application of said ringing current to the line, means dependent upon the electrical condition of the said connected called line talking contacts for energizing the interrupter control relay upon one condition of said contacts and for automatically actuating the ringing current control relay upon another condition of said contacts, and means under the control of the called party for discontinuing the application of ringing current to the line.

57. A telephone system comprising telephone lines extending from substations to an exchange, a pair of terminal contacts for each of said lines, a normally discontinuous link-circuit for inter-connecting the said contacts of calling and called lines to establish a talking circuit therethrough, an interrupter for causing a busy signal, a relay for controlling the connection of said interrupter to the calling line circuit, a source of ringing current, a relay for controlling the application of said ringing current to the line, means dependent upon the electrical condition of the said connected called line talking contacts for automatically actuating the interrupter control relay upon one condition of said contacts and for automatically actuating the ringing current control relay upon another condition of said contacts, and means under the control of the called party for discontinuing the application of ringing current to the line and completing a portion of said normally discontinuous link-circuit.

58. A telephone system comprising telephone lines extending from substations to an exchange, a pair of terminal contacts for each of said lines, a link-circuit for interconnecting the said contacts of calling and called lines to establish a talking circuit therethrough, an interrupter for causing a busy signal, a relay for controlling the connection of said interrupter to the calling line circuit, a source of ringing current, a relay for controlling the application of said ringing current to the line, means for actuating the interrupter control relay upon connection with a called line contact having a potential above that of ground and for actuating said ringing current control relay upon connection with a called line contact having a potential the same as that of ground, and means under the control of the called party for discontinuing the application of ringing current to the line.

59. A telephone system comprising telephone lines extending from substations to an exchange, talking contacts for each of said lines, a link-circuit for interconnecting the said contacts of calling and called lines to establish a talking circuit therethrough, an interrupter for causing a busy signal, a relay for controlling the connection of said interrupter to the calling line circuit, means for momentarily energizing said relay to cause its actuation, means dependent upon the condition of said talking contacts only for maintaining said relay in its actuated position if connection has been made to a busy called line, means actuated upon the release of said relay to apply ringing current to the called line, and means under the control of the called party for discontinuing the application of ringing current to the line.

60. A telephone system comprising telephone lines extending from substations to an exchange, terminal contacts for each of said lines, a normally discontinuous link-circuit for interconnecting the said contacts of calling and called lines to establish a talking circuit therethrough, an interrupter for causing a busy signal, a relay for controlling the connection of said interrupter to the calling line circuit, means for momentarily energizing said relay to cause its actuation, means for maintaining said relay in its actuated position if connection has been made to a busy called line, means actuated upon the release of said relay to apply ringing current to the called line, and means under the control of the called party for discontinuing the application of ringing current to the called line and for completing a portion of said normally discontinuous link-circuit at its normally disconnected point.

61. A telephone system comprising telephone lines extending from substations to an exchange, talking contacts for each of said lines, a link-circuit for interconnecting the said contacts of calling and called lines to establish a talking circuit therethrough, an interrupter for causing a busy signal, a relay for controlling the connection of said interrupter to the calling line circuit, means for momentarily energizing said relay to cause its actuation, means dependent upon the condition of said talking contacts only for maintaining said relay in its actuated position if connection has been made to a busy called line, a source of ringing current, a relay for controlling the application of said ringing current to the called line, means actuated upon the release of said interrupter control relay to actuate said ringing current control relay, and means under the control of the called party for discontinuing the application of ringing current to the line.

62. A telephone system comprising telephone lines extending from substations to an exchange, talking contacts for each of said lines, a normally discontinuous link-circuit for interconnecting the said contacts of calling and called lines to establish a talking circuit therethrough, an interrupter for causing a busy signal, a relay for controlling the connection of said interrupter to the calling line circuit, means for momentarily energizing said relay to cause its actuation, means dependent upon the condition of said talking contacts only for maintaining said relay in its actuated position if connection has been made to a busy called line, a source of ringing current, a relay for controlling the application of said ringing current to the called line, means actuated upon the release of said interrupter control relay to actuate said ringing current control relay, and means under the control of the called party for discontinuing the application of ringing current to the called line and for completing a portion of said normally discontinuous link-circuit.

63. A telephone system comprising telephone lines extending from substations to an exchange, a pair of talking contacts for each of said lines, a link-circuit for interconnecting the said contacts of calling and called lines to establish a talking circuit therethrough, a source of busy signal current, a source of ringing current, means for controlling the application of busy signal current to the calling line and ringing current to the called line, and means for operating said control means upon one condition of the said connected called line talking contacts to apply the busy signal current to the calling line without applying ringing current to the called line.

64. A telephone system comprising telephone lines extending from substations to an exchange, a pair of talking contacts for each of said lines, a link-circuit for interconnecting the said contacts of calling and called lines to establish a talking circuit therethrough, a source of busy signal current, a source of ringing current, electromagnetically actuated means for controlling the application of busy signal current to the calling line and ringing current to the called line, means controlled over the calling line to initially operate said controlling means to apply the busy signal current, and means dependent upon the condition of the said connected called line talking contacts to continue the said application of busy signal current.

65. A combined manual and automatic telephone system comprising a plurality of telephone lines, part provided with manual and part with automatic substation equipment, manually operated link-circuit apparatus for establishing connection for conversational purposes between a manually equipped calling line and any other desired one of said lines, electrically actuated link-circuit apparatus for automatically establishing connection for conversational purposes between an automatically equipped calling line and any other desired one of said lines, and a central source for supplying talking current to the substations of connected lines.

66. A combined manual and automatic telephone system comprising a plurality of telephone lines, part provided with manual and part with automatic substation equipment, manually operated link-circuit apparatus for establishing connection for conversational purposes between a manually equipped calling line and any other desired one of said lines, a central source for supplying talking current to the substations of connected lines and automatic switch mechanism associated with the lines having said automatic substation equipment and controlled by said equipment to extend the circuits of said lines.

67. A combined manual and automatic telephone system comprising a plurality of telephone lines, part provided with manual and part with automatic substation equipment, manually operated link-circuit apparatus for establishing connection for conversational purposes between a manually equipped calling line and any other desired one of said lines, a central source for supplying talking current to the manually equipped substation thus connected, and common battery automatic switch mechanism associated with the lines having said automatic substation equipment and controlled by said equipment to extend the circuits of said lines.

68. A combined manual and automatic telephone system comprising a plurality of telephone lines, part provided with manual and part with automatic substation equipment, manually operated link-circuit apparatus for establishing connection for conversational purposes between a manually equipped calling line and any other desired one of said lines, a central source for supplying talking current to the substations of connected lines, means for indicating to the operator the busy condition of any called line sought to be manually connected and automatic switch mechanism associated with the lines having said automatic substation equipment and controlled by said equipment to extend the circuits of said lines.

69. A combined manual and automatic telephone system comprising a plurality of telephone lines, part provided with manual and part with automatic substation equipment, manually operated link-circuit apparatus for establishing connection for conversational purposes between a manually equipped calling line and any other desired one of said lines, a central source for supplying talking current to the manually equipped substation thus connected, means for indicating to the operator the busy condition of any called line sought to be manually connected, and common battery automatic switch mechanism associated with the lines having said automatic substation equipment and controlled by said equipment to extend the circuits of said lines.

70. A combined manual and automatic telephone system comprising a plurality of telephone lines, part provided with manual and part with automatic substation equipment, automatically operated link-circuit apparatus under the control of said automatic substation equipment for establishing connection for conversational purposes between an automatically equipped calling line and any other desired line, a central source for supplying talking current to the substations of connected lines, and means for automatically indicating to the calling subscriber the busy condition of any called line sought to be automatically connected.

71. A combined manual and automatic telephone system comprising a plurality of telephone lines, part provided with manual and part with automatic substation equipment, automatically operated link-circuit apparatus under the control of said automatic substation equipment for establishing connection for conversational purposes between an automatically equipped calling line and any other desired line, a central source for supplying talking current to the manually equipped substation thus connected, and means for automatically indicating to the calling subscriber the busy condition of any called line sought to be automatically connected.

72. A combined manual and automatic telephone system comprising a plurality of telephone lines, part provided with manual and part with automatic substation equipment, multiple spring jacks and multiple switch contacts for each of said lines, link-circuits and connecting plugs for manually establishing connection for conversational purposes between different lines, a central source for supplying talking current to the manually equipped substations thus connected, means for indicating to the operator the busy condition of a called line sought to be thus connected, automatic interconnecting means for making connection with said contacts, and means for automatically indicating to a calling subscriber at an automatically equipped substation the busy condition of a called line sought to be thus automatically connected.

73. A combined manual and automatic telephone system comprising a plurality of telephone lines, part provided with manual and part with automatic substation equipment, manually operated link-circuit apparatus for establishing connection for conversational purposes between a manually equipped calling line and any other desired one of said lines, electrically actuated link-circuit apparatus for automatically establishing connection for conversational purposes between an automatically equipped calling line and any other desired one of said lines, a central source for supplying talking current to the substations of connected lines, and means under the control of a called party for controlling the supply of said talking current to a calling substation provided with automatic equipment.

74. A combined manual and automatic telephone system comprising a plurality of telephone lines, part provided with manual and part with automatic substation equipment, electrically actuated link circuit apparatus for automatically establishing a connection for conversational purposes between an automatically equipped calling line and any other of said lines, link circuits for connecting a manually equipped calling line and any other desired one of said lines, and a central source for supplying talking current to the substations of the connected lines.

75. A combined manual and automatic telephone system comprising a plurality of telephone lines, part provided with manual and part provided with automatic substation equipment, electrically actuated link circuit apparatus for automatically establishing a connection for conversational purposes between an automatically equipped calling line and a manually equipped called line, link circuits for establishing connection between a manually equipped calling line and an automatically equipped called line, and a central source for supplying talking current to the substations thus connected.

76. A telephone system comprising telephone lines, a pair of terminal contacts for each of said lines, electrically actuated connecting mechanism operated from a calling station to establish connection with the pair of terminal contacts of a called line to complete the conversational circuit therethrough, and means initially operated from the calling station and dependent for its continued operation upon the electrical condition of the encountered pair of contacts to indicate to the calling party the busy condition of the called line.

77. A telephone system comprising telephone lines, a pair of terminal contacts for each of said lines, electrically actuated connecting mechanism operated from a calling station to establish connection with the pair of terminal contacts of the called line to complete a conversational circuit therethrough, an interrupter for transmitting a busy signal to the calling party, means initially operated from the calling station and sensitive to a potential upon an encountered contact of said pair other than that of ground for rendering said interrupter operative to transmit its signal.

78. A telephone system comprising telephone lines, a pair of terminal contacts for each of said lines, electrically actuated connecting mechanism operated from a calling station to establish connection with the pair of terminal contacts of the called line to complete a conversational circuit therethrough, an interrupter for transmitting a busy signal to the calling party, a relay for controlling said interrupter, and means for initially actuating said relay from the calling station and maintaining it actuated upon the engagement of said interconnecting means with a live contact of the pair of contacts of said called line.

79. A telephone system comprising telephone lines, a pair of talking contacts for each of said lines, electrically actuated connecting mechanism operated from a calling station to establish connection with the pair of talking contacts of the called line to complete a conversational circuit therethrough, an interrupter for transmitting a busy signal to the calling party, a relay for controlling said interrupter, means for momentarily actuating said relay from the calling station, and means dependent upon the condition of said talking contacts only for maintaining said relay in its actuated position in case the called line be busy.

80. A telephone system comprising a telephone line, associated link-circuits, automatic switch mechanism including coöperating movable and fixed contacts for establishing a portion of a conversational circuit between a calling station and said line, and means initially operated from said calling station and dependent for its continued operation upon the electrical condition of a talking contact of said line to indicate to the calling party the busy condition of said line.

81. A combined manual and automatic telephone system comprising a plurality of telephone lines, part provided with manual and part with automatic substation equipment, movable terminals normally connected to each automatically equipped line, manually operated link-circuit apparatus for establishing connection for conversational purposes between a manually equipped calling line and an automatically equipped called line, and electrically operated means actuated by current over a portion of the talking circuit thus established to destroy the normal connection between the called line and its movable contacts.

82. A combined manual and automatic telephone system comprising a plurality of telephone lines, part provided with manual and part with automatic substation equipment, line signals associated with the manually equipped lines normally under the control of the subscribers, electrically actuated link-circuit apparatus for automatically completing connection for conversational purposes between an automatically equipped calling line and a manually equipped called line, and electrically actuated means operated by current over a portion of the talking circuit thus established to destroy the substation control of the called line signal.

83. A combined manual and automatic telephone system comprising a plurality of telephone lines, part provided with manual and part with automatic substation equipment, line signals associated with the manually equipped lines and normally under the control of the subscribers, movable contacts normally connected to each automatically equipped line, manually operated link-circuit apparatus for establishing connection for conversational purposes between a manually equipped calling line and an automatically equipped called line, electrically operated means actuated by current over a portion of the talking circuit thus manually established to destroy the normal connection between the called line and its movable contacts, electrically actuated link-circuit apparatus for automatically completing connection for conversational purposes between an automatically equipped calling line and a manually equipped called line, and electrically operated means actuated by current over a portion of the talking circuit thus automatically established to destroy the substation control of the called line signal.

84. A telephone system comprising telephone lines extending from substations to an exchange, terminal contacts for each of said lines, a link-circuit for interconnecting said contacts of calling and called lines to establish a talking circuit therethrough, an interrupter for causing a busy signal, a relay for controlling the connection of said interrupter to the calling line circuit having an energizing winding and a locking winding, means for momentarily closing a circuit through the energizing winding of said relay to cause its actuation, and means for completing a circuit through the locking winding of said relay over a path including one of the contacts of said called line.

85. A telephone system comprising telephone lines extending from substations to an exchange, terminal contacts for each of said lines, a link-circuit for interconnecting said contacts of calling and called lines to establish a talking circuit therethrough, an interrupter for causing a busy signal, a relay for controlling the connection of said interrupter to the calling line circuit, having an energizing winding and a locking winding, means for momentarily closing a circuit through the energizing winding of said relay to cause its actuation, means, dependent upon the busy condition of said called line, for closing a circuit through the locking winding of said relay including one of the contacts of said called line, a source of ringing current, a relay for controlling the application of said ringing current to the called line, and means actuated upon the release of said interrupter control relay to complete a circuit for said ringing current control relay through one of the contacts of said called line.

86. An automatic telephone system comprising telephone lines extending from substations to an exchange, "connector" switches each having a pair of terminal contacts for each of said lines, advancing "selector" switches for coöperation with said "connector" switches to interconnect calling and called lines to establish a talking circuit extending through said "selector" and "connector" switches and through the pair of "connector" contacts of the called line, and means dependent upon the electrical condition of the said connected called line talking contacts for automatically transmitting a busy signal to the calling line upon one condition of said contacts and ringing current to the called line upon another condition of said contacts.

87. A combined manual and automatic telephone system comprising telephone lines, part provided only with manual, part only with automatic substation equipment, common battery manually operated link circuit apparatus for establishing connection for conversational purposes between a manually equipped calling line and any other desired one of said lines, and common battery automatic switch mechanism associated with the lines having said automatic substation equipment and controlled by said equipment to extend the circuits of said lines.

88. A combined manual and automatic telephone system, comprising automatic and manually equipped substation telephone lines, manually operated link circuit apparatus for establishing connection for conversational purposes between a manually equipped calling line and any other desired one of said lines, automatic link circuit apparatus for establishing connection for conversational purposes between an automatically equipped calling line and any other desired one of said lines, and exchange talking and operating battery supply for said system.

89. A combined manual and automatic telephone system comprising manually and automatically equipped substations, electrically actuated link circuit apparatus for automatically completing connection for conversational purposes between an automatically equipped calling line and a manually equipped called line, means controlled from a connected substation for restoring the interconnecting apparatus to normal at the end of conversation, operator's means for extending the circuit of manual lines to any other desired one of said lines, and exchange talking and operating battery supply for said system.

90. In a telephone system, a called subscriber's line, an automatic connector switch for connection therewith, means responsive to such connection for automatically intermittently applying signaling current to the said called line, and means responsive to the removal of the receiver at the called subscriber's substation for automatically disconnecting the said signaling current.

91. In a telephone system, a called subscriber's line, a substation thereon provided with a signal receiving device, an automatic connector switch for connection to said line, signaling means associated with said connector switch, means for intermittently applying said signaling means to the line of the said called subscriber to intermittently operate said signal receiving device, and means controlled by the response of the called subscriber for immediately disconnecting the signaling means from said called line.

92. In a telephone system, a called subscriber's line, an automatic connector switch for connection therewith provided with signaling means, means for intermittently applying said signaling means to the line of the said called subscriber, and means controlled by the response of said called subscriber whether during a ringing period or a silent period for automatically disconnecting the said signaling means.

93. In a telephone system, a calling subscriber's line, a called subscriber's line, directively controlled automatic switching apparatus including an automatic connector switch for connecting said calling and called lines in conversational circuit, signaling means associated with said connector switch, an automatic device for periodically connecting the said signaling means to the said called subscriber's line, a battery, means for connecting the said battery to the called subscriber's line between the said signaling periods, and means responsive to a flow of current from the said battery for disconnecting the said signaling means from the called subscriber's line.

94. In a telephone system, a called subscriber's line, an automatic connector switch for connection thereto, a battery, signaling means connected to one terminal of said battery, means for alternately connecting said signaling means and said battery to the called subscriber's line, and means controlled by the response of said called subscriber for instantly disconnecting the said signaling means from the called subscriber's line.

95. In a telephone system, a called subscriber's line, an automatic connector switch for connection therewith; a battery; a ringing current generator having one terminal connected to said battery, associated with said connector; means for intermittently applying signaling current from said current generator to the called subscriber's line; and an electromagnetic device responsive to the said battery when the called subscriber removes his receiver to automatically disconnect the said ringing current from the called subscriber's line.

96. In a telephone system, a called subscriber's line provided with a substation thereon, a condenser normally in series with said line, an automatic connector switch adapted to be connected with said line, a current generator having one of its terminals connected to battery associated with said connector, means for intermittently applying current from said generator to said called subscriber's line, means for removing the said condenser from the subscriber's line, and means responsive to said removal for disconnecting the said ringing current.

97. In a telephone system, a called subscriber's line, an inductive bridge connected across said line, an automatic connector switch for connection with said line, a ringing current generator associated with said connector switch, means for intermittently applying current from said generator to said called line, means for replacing said inductive by a conductive bridge, and means responsive to said replacement for automatically disconnecting the ringing current from said called subscriber's line.

98. In a telephone system, a called subscriber's line, an automatic connector switch for connection therewith provided with a ringing current generator, means responsive to said connection for intermittently connecting the said ringing current generator to the called subscriber's line, means controlled by the removal of the receiver at the called subscriber's substation for automatically disconnecting the said ringing current generator, and a locking device for preventing the reapplication of said ringing current until said connector switch has been disconnected from said subscriber's line.

99. In a telephone system, an automatic connector switch for establishing connection with a called subscriber's line, a ringing current generator, a relay for connecting current from said generator to the called subscriber's line, means for intermittently applying the said current to the called line, means controlled by the called subscriber for disconnecting the said ringing current, and a relay for preventing the reconnection of said current to the said called line until the said connector has been restored to normal.

In witness whereof, I hereunto subscribe my name this 25th day of April 1906.

ALFRED H. DYSON.

Witnesses:
 A. G. WEBSTER,
 G. E. MUELLER.

Copies of this patent may be obtained for five cents each, by addressing the "Commissioner of Patents, Washington, D. C."